Figure 32:
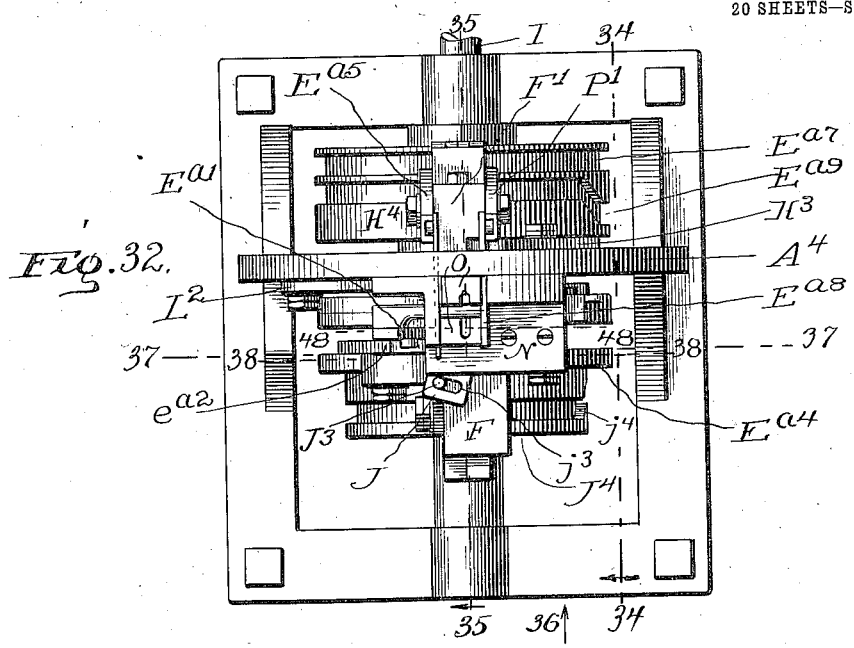

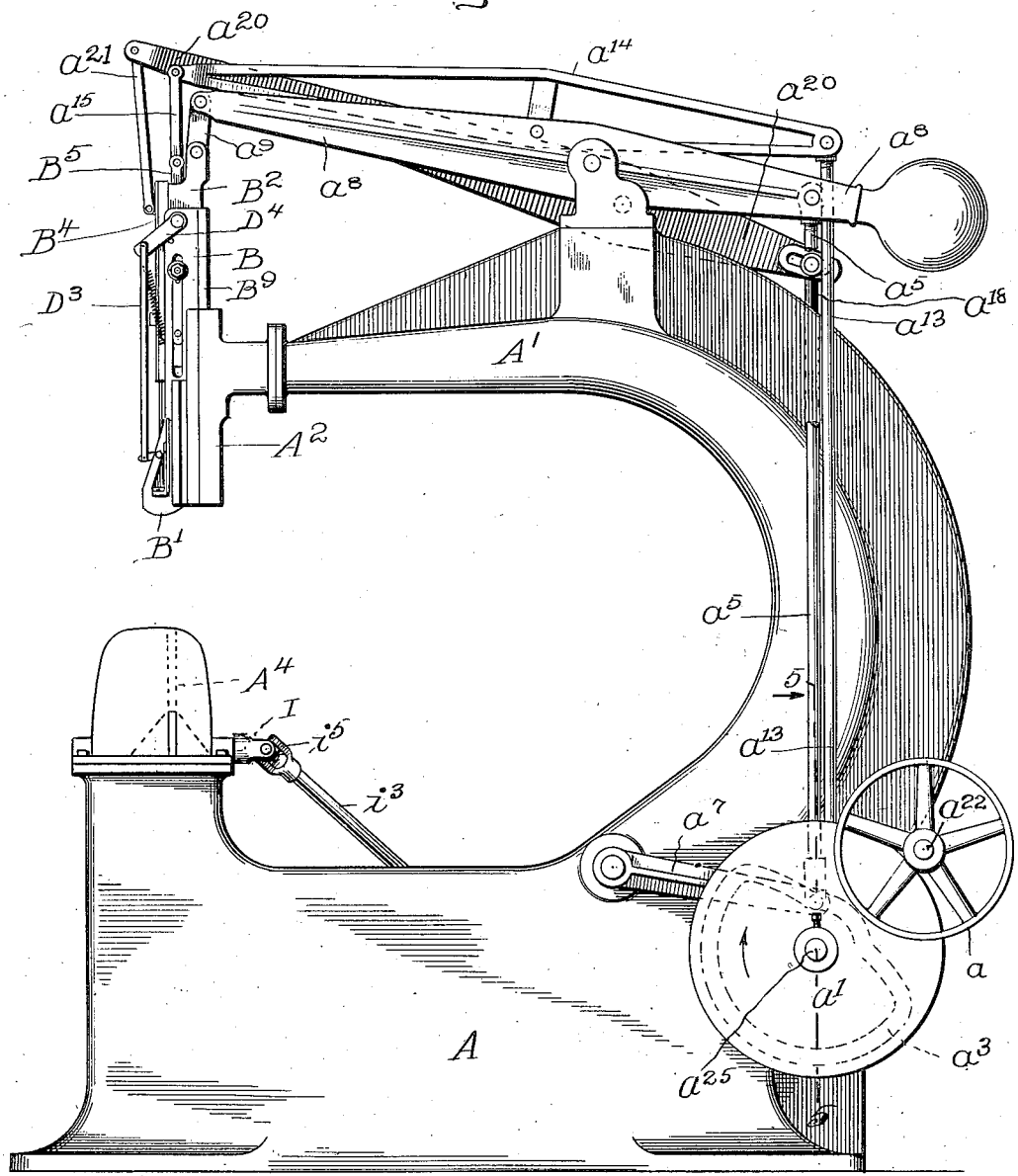

No. 819,955. PATENTED MAY 8, 1906.
R. R. THOMPSON & C. F. PINKHAM.
MACHINE FOR TUFTING MATTRESSES.
APPLICATION FILED MAR. 18, 1903.
20 SHEETS—SHEET 2.
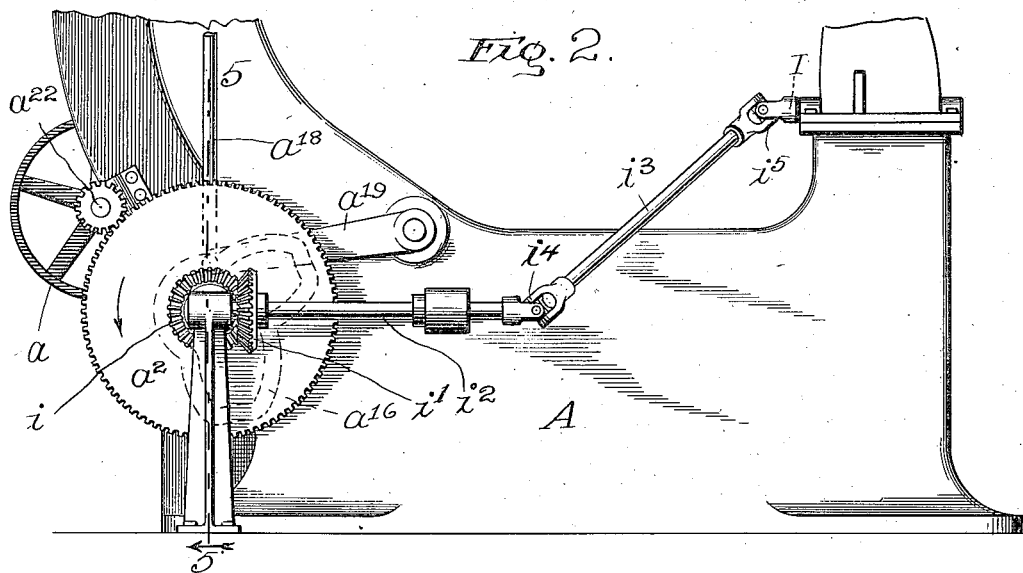
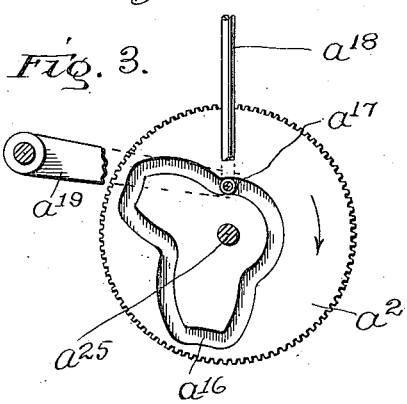
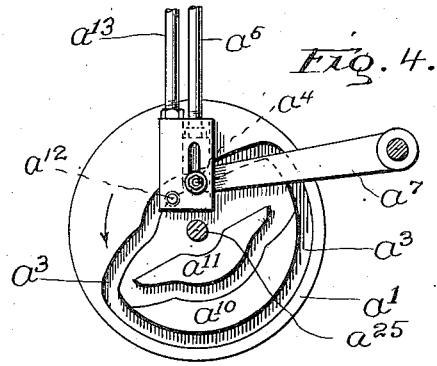
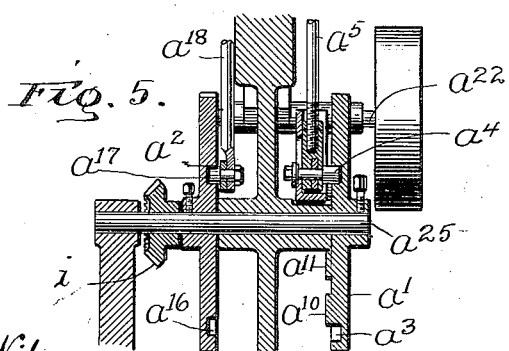
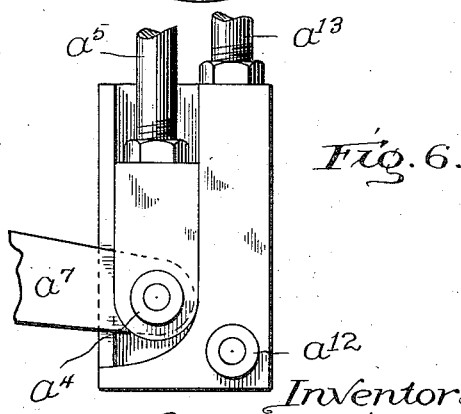
Witnesses:
Russell Wiler
Chas. O. Shorey
Inventors:
Robert R. Thompson
Charles F. Pinkham,
by H. Bitner
Atty.

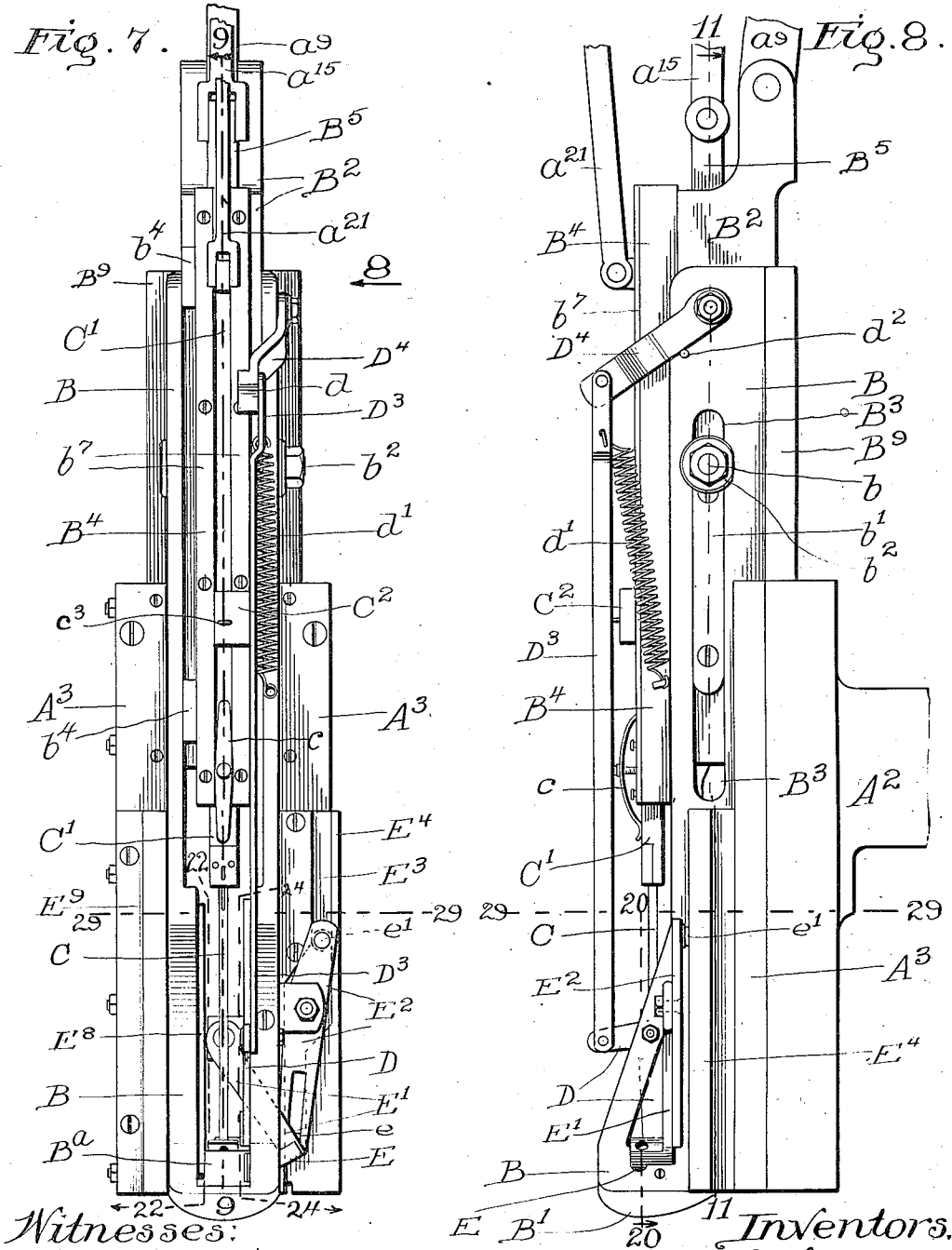

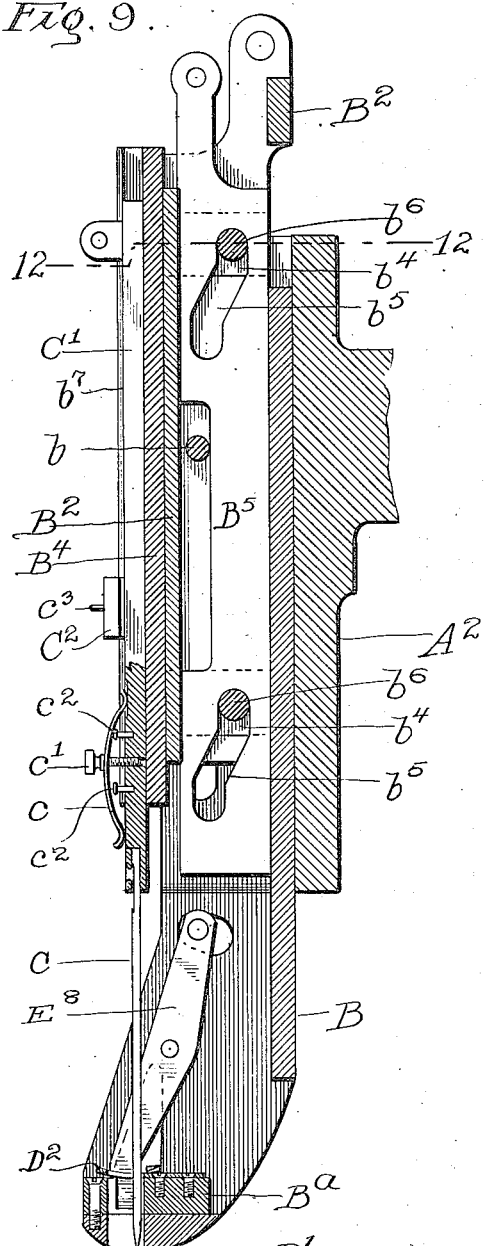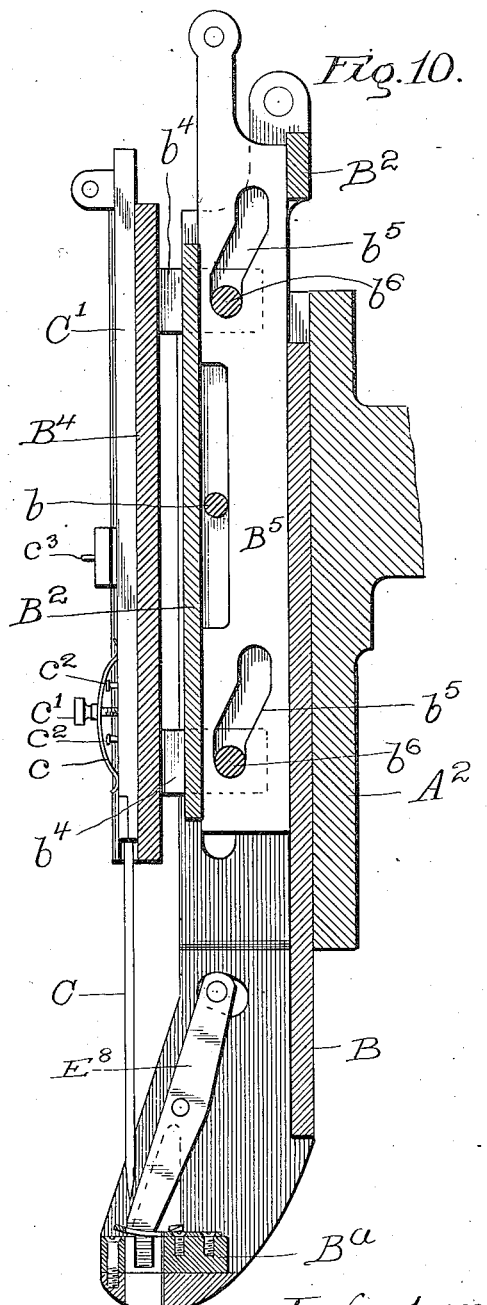

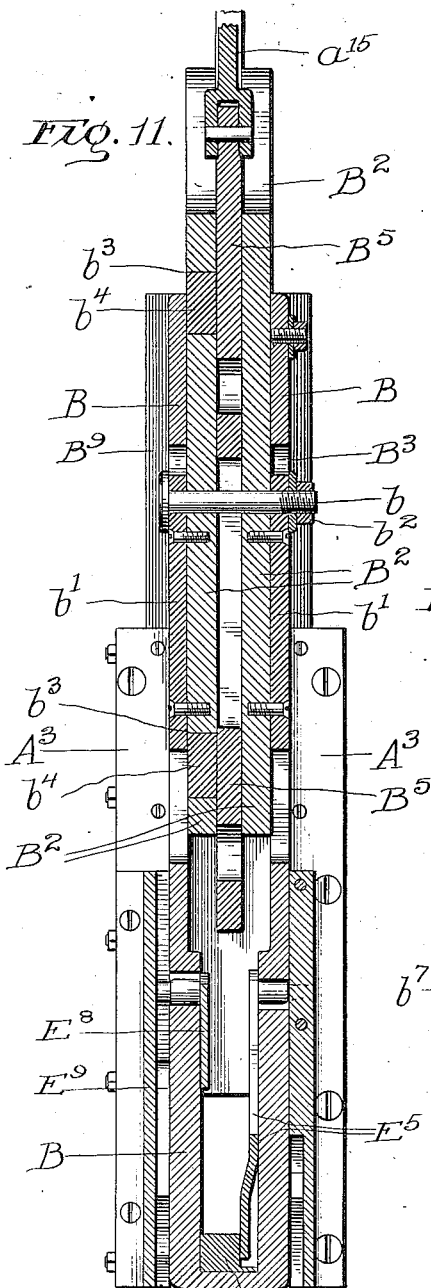

No. 819,955. PATENTED MAY 8, 1906.
R. R. THOMPSON & C. F. PINKHAM.
MACHINE FOR TUFTING MATTRESSES.
APPLICATION FILED MAR. 18, 1903.
20 SHEETS—SHEET 6.
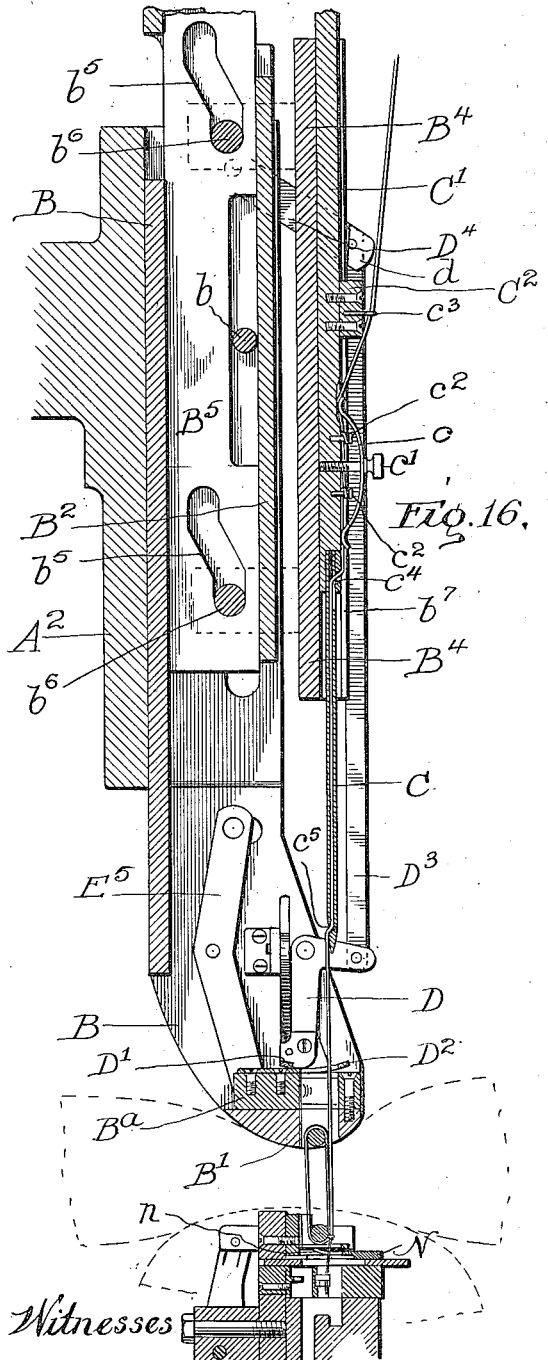
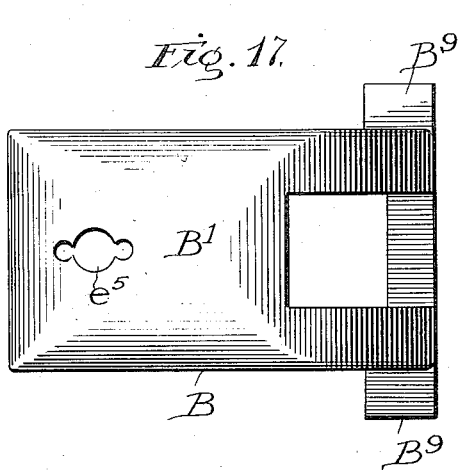
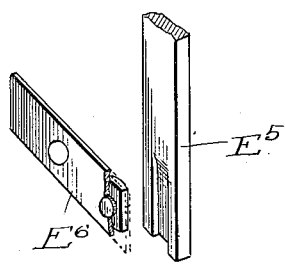

No. 819,955. PATENTED MAY 8, 1906.
R. R. THOMPSON & C. F. PINKHAM.
MACHINE FOR TUFTING MATTRESSES.
APPLICATION FILED MAR. 18, 1903.
20 SHEETS—SHEET 7.
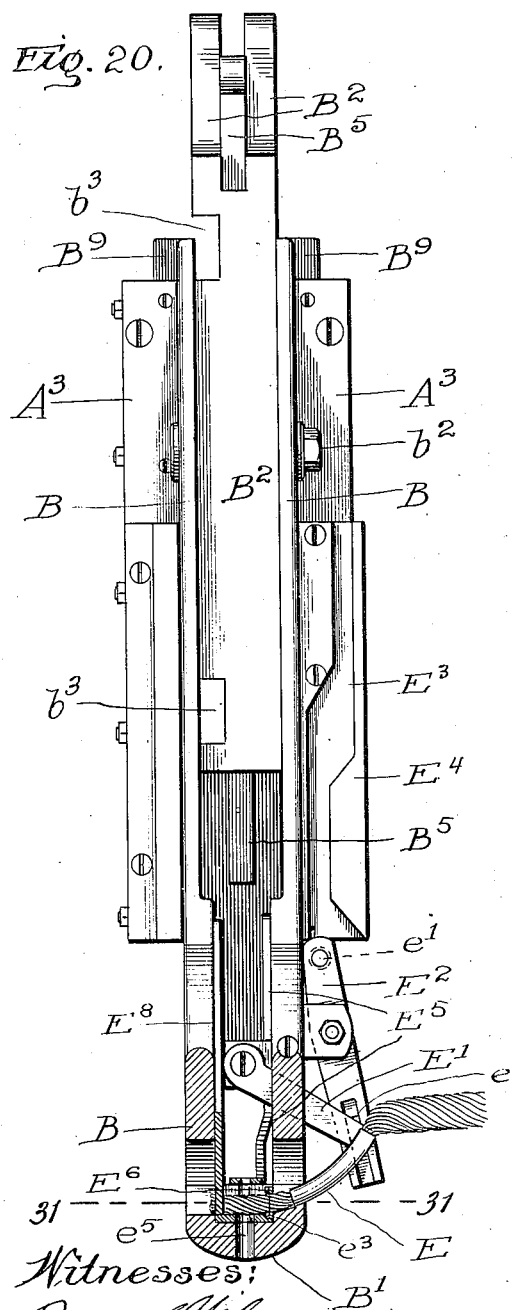
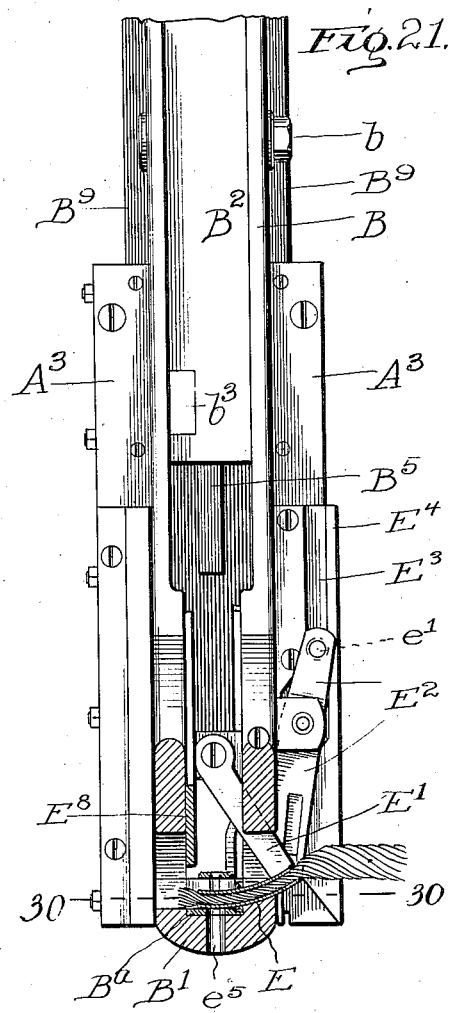
Witnesses:
Russell A. Wiles
Chas. O. Sherwey
Inventors:
Robert R. Thompson
Charles F. Pinkham,
by H. Bitner
Atty.

No. 819,955. PATENTED MAY 8, 1906.
R. R. THOMPSON & C. F. PINKHAM.
MACHINE FOR TUFTING MATTRESSES.
APPLICATION FILED MAR. 18, 1903.
20 SHEETS—SHEET 8.
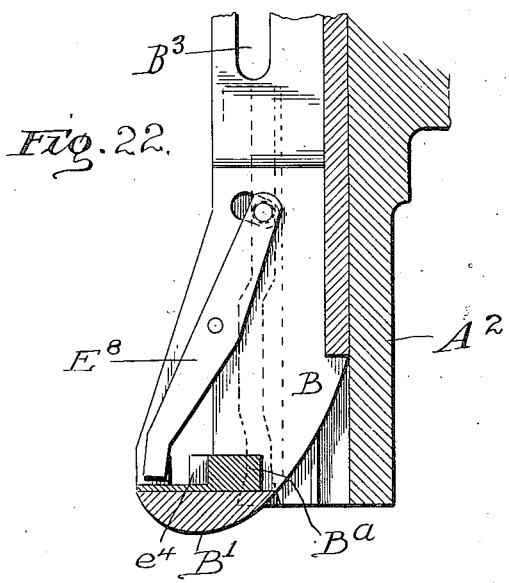
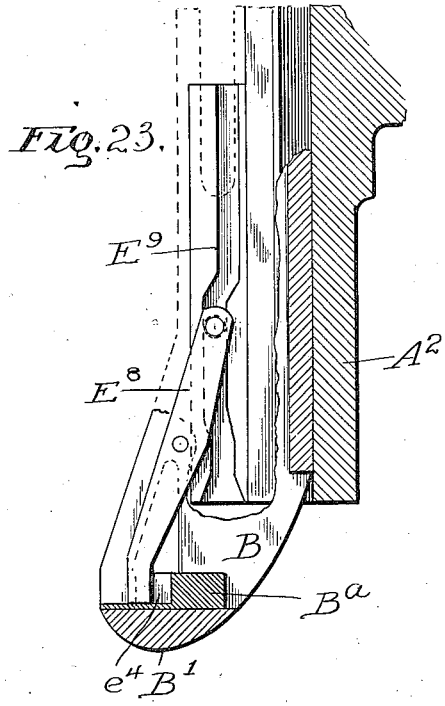
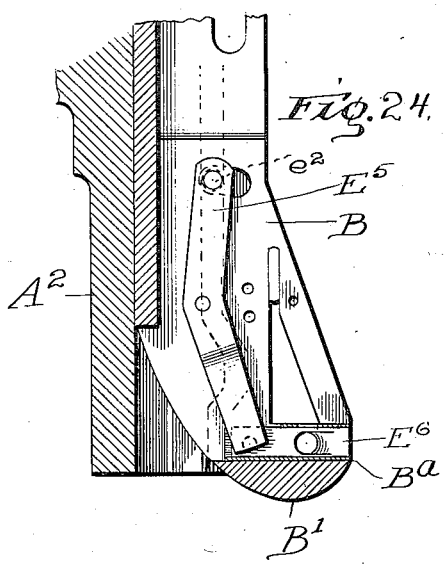
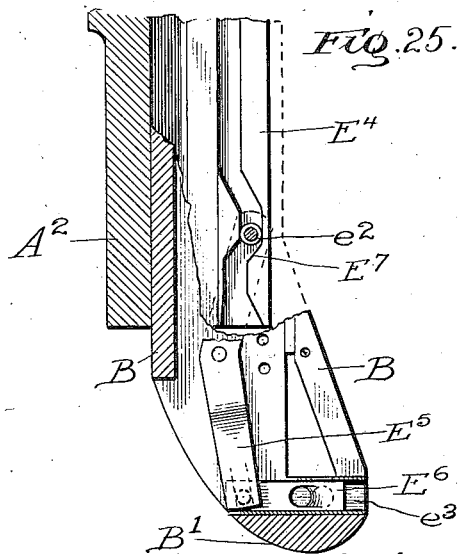
Witnesses:
Russell Wiles
Chas. O. Shurvey
Inventors:
Robert R. Thompson
Charles F. Pinkham,
by H. Bitner,
Atty.

No. 819,955. PATENTED MAY 8, 1906.
R. R. THOMPSON & C. F. PINKHAM.
MACHINE FOR TUFTING MATTRESSES.
APPLICATION FILED MAR. 18, 1903.
20 SHEETS—SHEET 9.
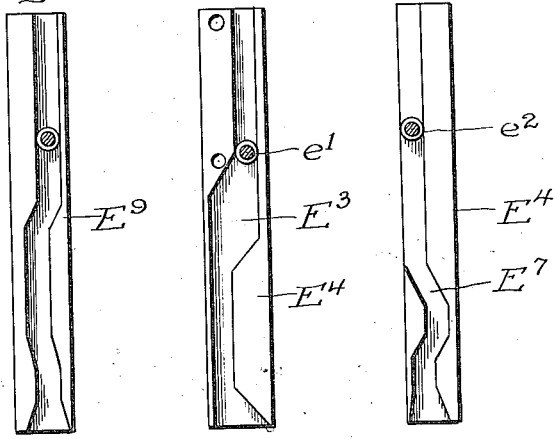
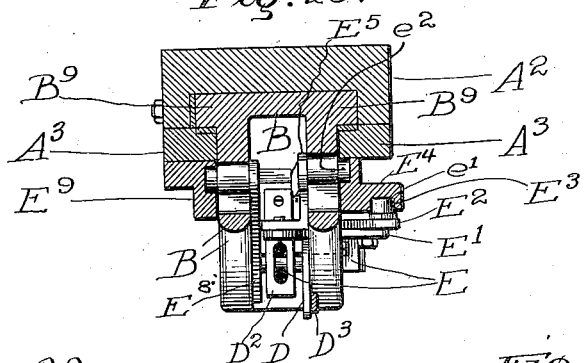
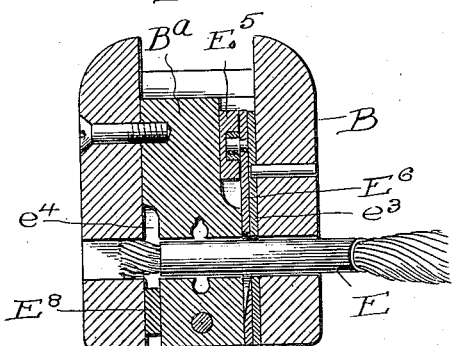
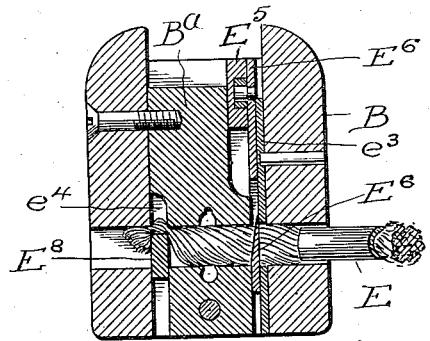
Witnesses:
Russell Wiles.
Chas. O. Shurvey
Inventors:
Robert R. Thompson
Charles F. Pinkham
by H. Bitner
Atty.

No. 819,955. PATENTED MAY 8, 1906.
R. R. THOMPSON & C. F. PINKHAM.
MACHINE FOR TUFTING MATTRESSES.
APPLICATION FILED MAR. 18, 1903.
20 SHEETS—SHEET 10.

Witnesses:
Russell Wiles
Chas O. Sherwey.

Inventors:
Robert R. Thompson
Charles F. Pinkham,
by H. Bitner.
Atty.

No. 819,955. PATENTED MAY 8, 1906.
R. R. THOMPSON & C. F. PINKHAM.
MACHINE FOR TUFTING MATTRESSES.
APPLICATION FILED MAR. 18, 1903.

20 SHEETS—SHEET 11.

Witnesses:
Russell Wiles
Chas. O. Shervey

Inventors:
Robert R. Thompson
Charles F. Pinkham
by H. Bitner
Atty.

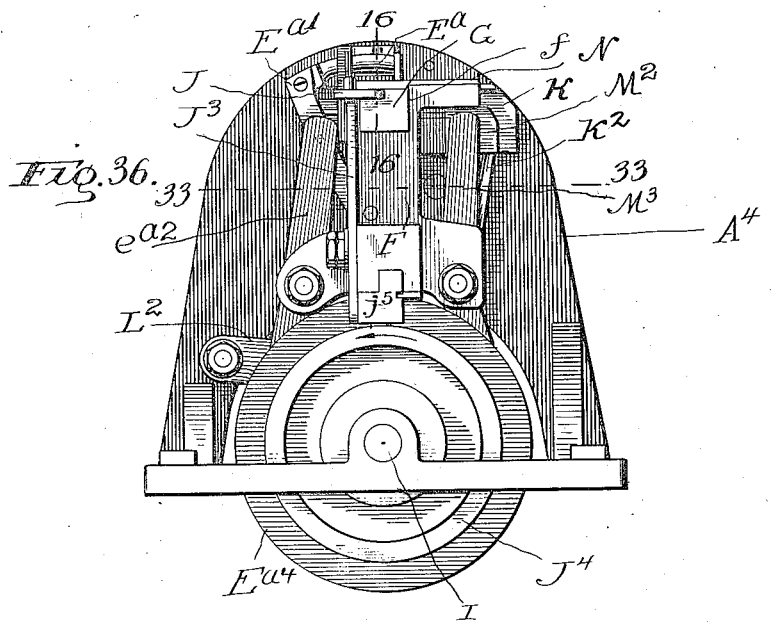
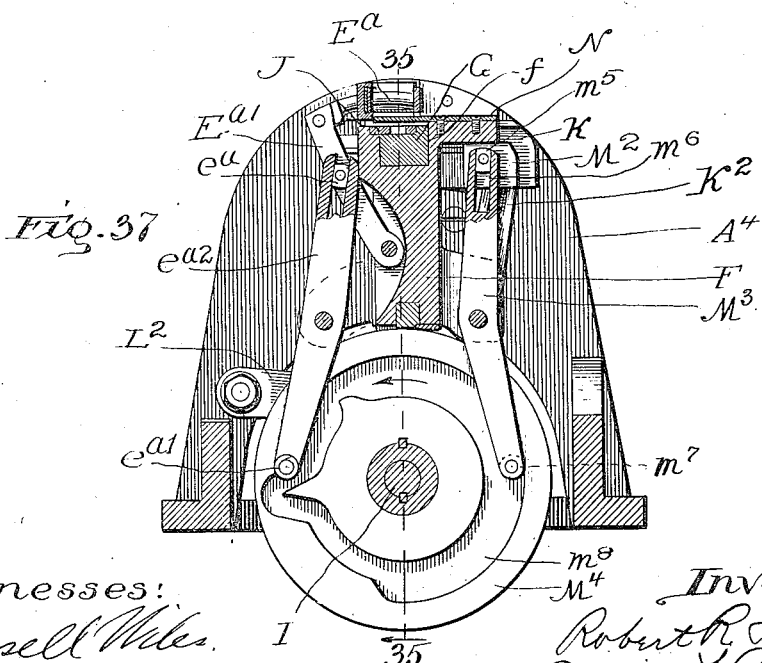

No. 819,955. PATENTED MAY 8, 1906.
R. R. THOMPSON & C. F. PINKHAM.
MACHINE FOR TUFTING MATTRESSES.
APPLICATION FILED MAR. 18, 1903.

20 SHEETS—SHEET 13.

Witnesses:
Russell Miles
Chas. O. Shervey

Inventors:
Robert R. Thompson
Charles F. Pinkham
by H. Bitner,
Atty.

No. 819,955. PATENTED MAY 8, 1906.
R. R. THOMPSON & C. F. PINKHAM.
MACHINE FOR TUFTING MATTRESSES.
APPLICATION FILED MAR. 18, 1903.

20 SHEETS—SHEET 14.

Witnesses:
Russell Wiles
Chas. O. Shurvey

Inventors:
Robert R. Thompson
Charles F. Pinkham,
by H. Bitner
Atty.

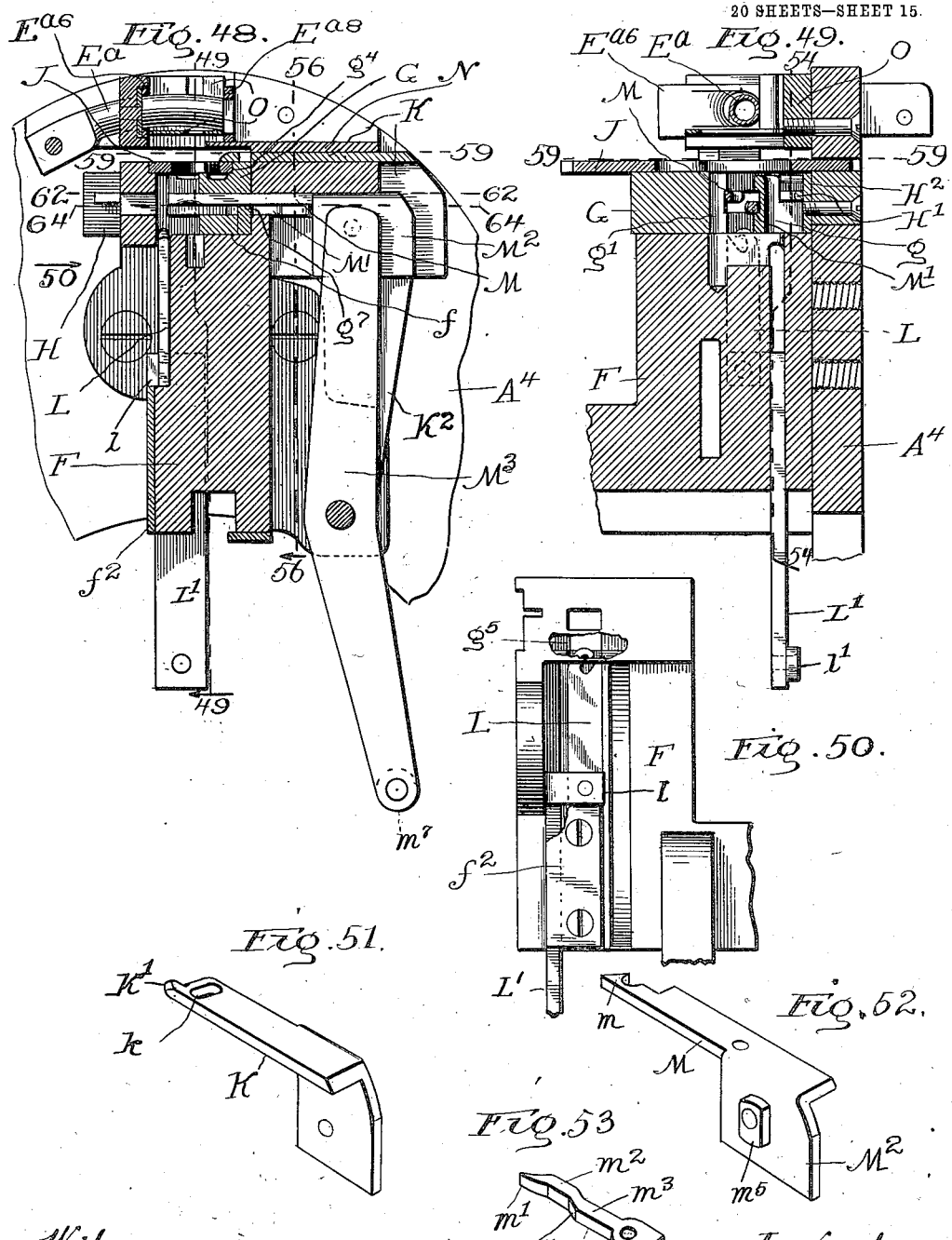

No. 819,955. PATENTED MAY 8, 1906.
R. R. THOMPSON & C. F. PINKHAM.
MACHINE FOR TUFTING MATTRESSES.
APPLICATION FILED MAR. 18, 1903.
20 SHEETS—SHEET 16.
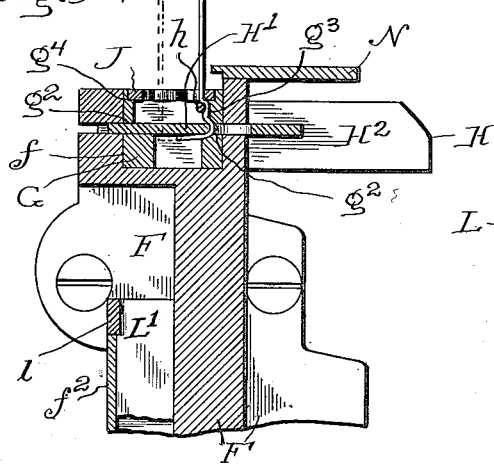
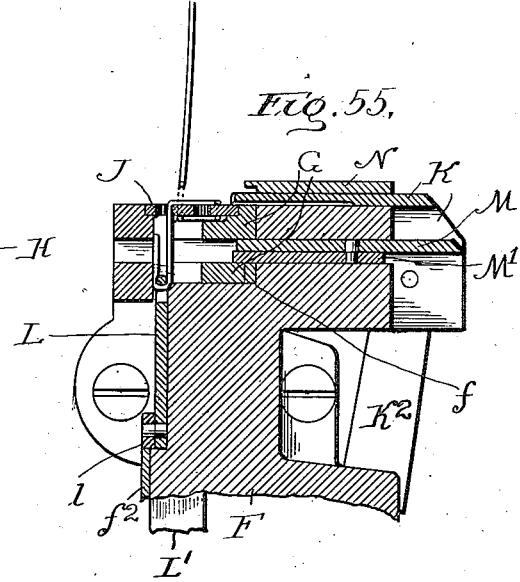
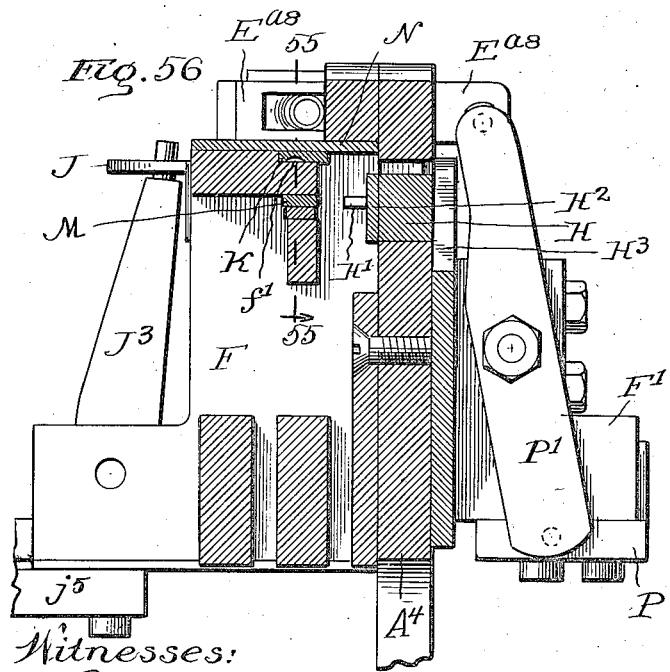
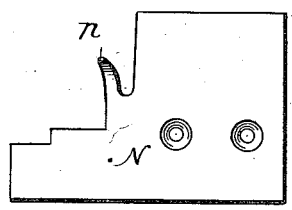
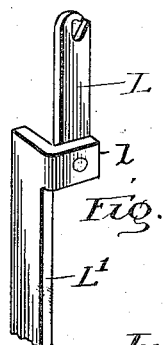
Witnesses:
Russell Wiles
Chas. O. Hervey
Inventors:
Robert R. Thompson,
Charles F. Pinkham,
by H. Bitner,
Atty.

No. 819,955. PATENTED MAY 8, 1906.
R. R. THOMPSON & C. F. PINKHAM.
MACHINE FOR TUFTING MATTRESSES.
APPLICATION FILED MAR. 18, 1903.
20 SHEETS—SHEET 17.
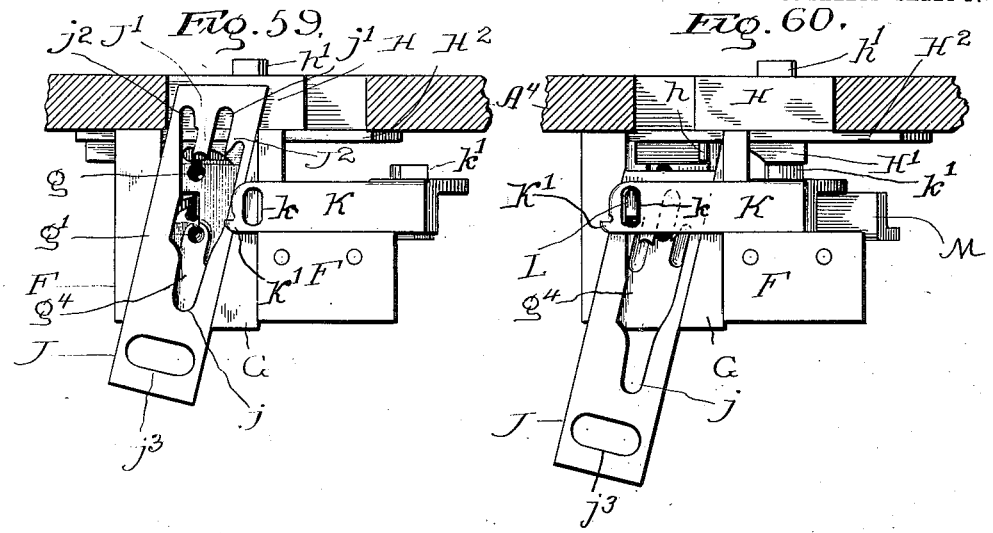
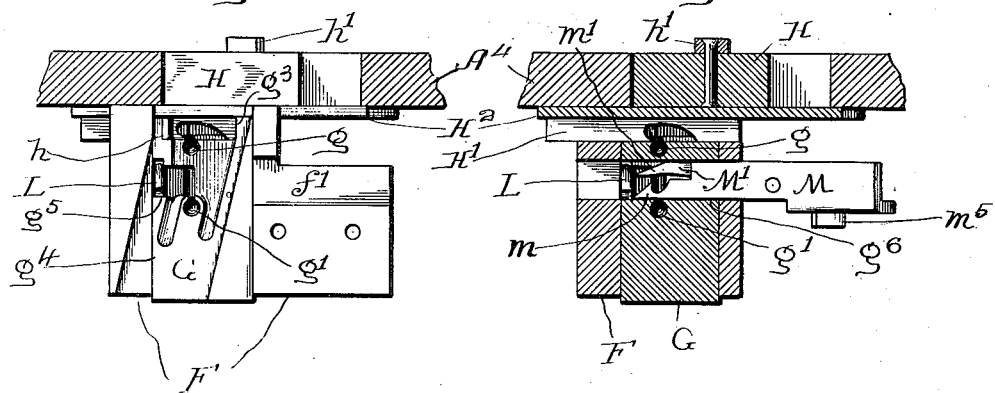
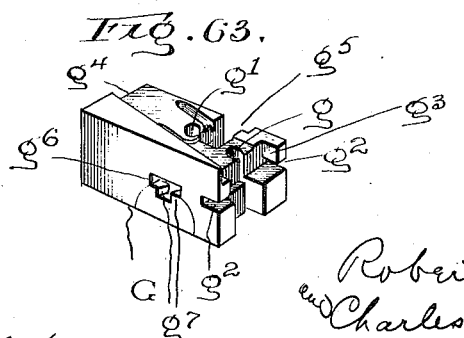
Witnesses:
Russell Wiles
Chas. O. Sherwey
Inventors:
Robert R. Thompson
and Charles F. Pinkham
by H. Bitner
Atty.

No. 819,955. PATENTED MAY 8, 1906.
R. R. THOMPSON & C. F. PINKHAM.
MACHINE FOR TUFTING MATTRESSES.
APPLICATION FILED MAR. 18, 1903.
20 SHEETS—SHEET 18.
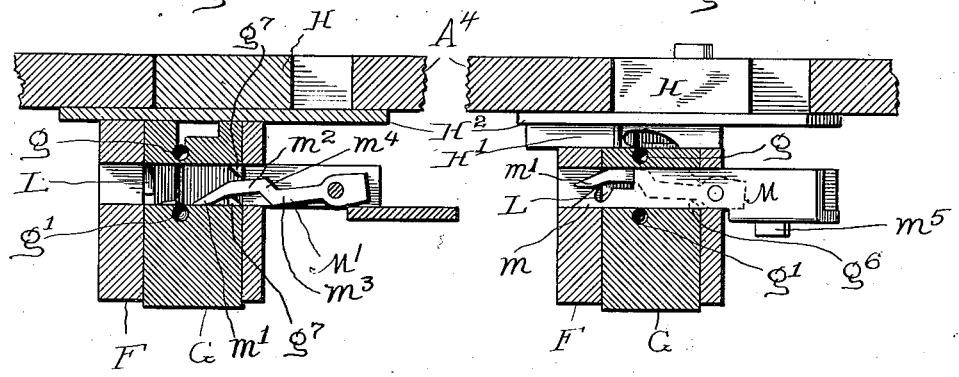
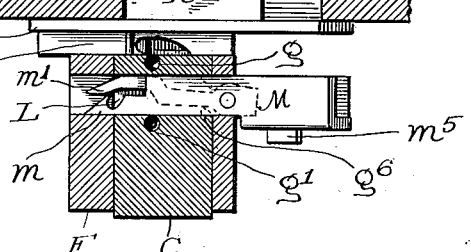
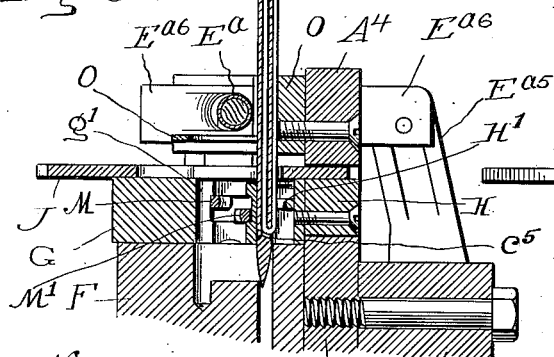
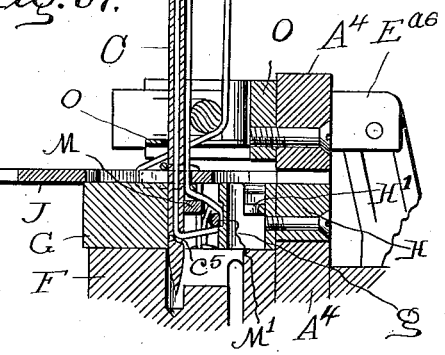
Witnesses:
Russell Miles
Chas. O. Hervey
Inventors:
Robert R. Thompson
Charles F. Pinkham
by H. Bitner, Atty.

No. 819,955. PATENTED MAY 8, 1906.
R. R. THOMPSON & C. F. PINKHAM.
MACHINE FOR TUFTING MATTRESSES.
APPLICATION FILED MAR. 18, 1903.

20 SHEETS—SHEET 19.

Witnesses:
Russell Wiles
Chas. O. Shervey

Inventors:
Robert R. Thompson
Charles F. Pinkham
by H. Bitner
Atty.

No. 819,955. PATENTED MAY 8, 1906.
R. R. THOMPSON & C. F. PINKHAM.
MACHINE FOR TUFTING MATTRESSES.
APPLICATION FILED MAR. 18, 1903.
20 SHEETS—SHEET 20.
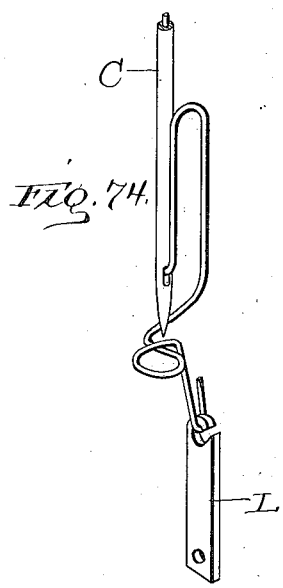
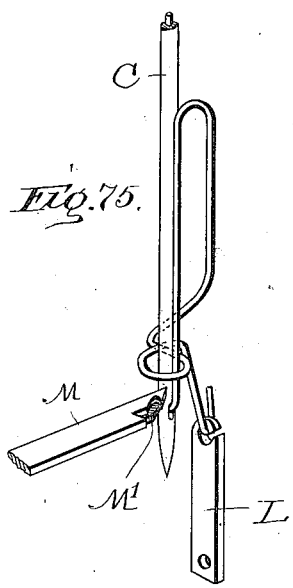
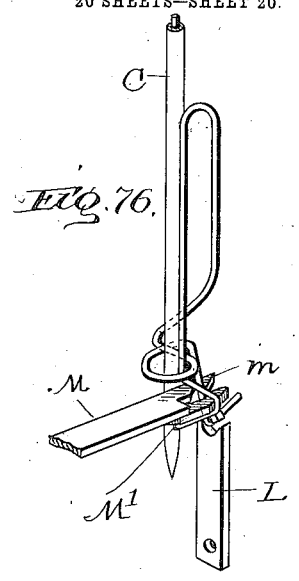
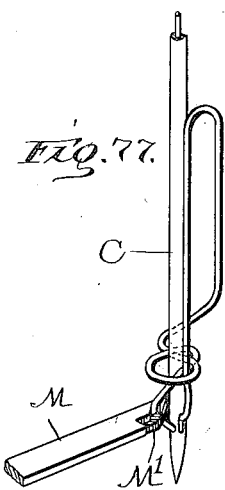
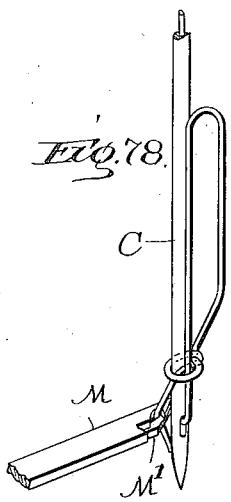
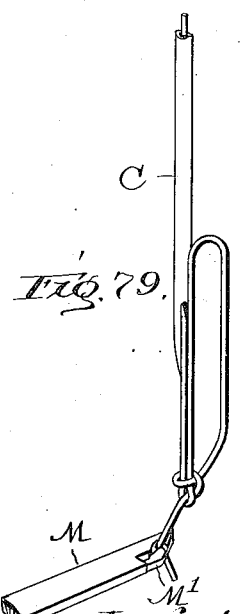
Witnesses:
Russell Wiles
Chas. O. Shervey
Inventors:
Robert R. Thompson,
Charles F. Pinkham,
by H. Bitner,
Atty.

UNITED STATES PATENT OFFICE.

ROBERT R. THOMPSON AND CHARLES F. PINKHAM, OF BOSTON, MASSACHUSETTS, ASSIGNORS, BY DIRECT AND MESNE ASSIGNMENTS, TO UNITED MATTRESS MACHINERY COMPANY, A CORPORATION OF MAINE.

MACHINE FOR TUFTING MATTRESSES.

No. 819,955.

Specification of Letters Patent.

Patented May 8, 1906.

Application filed March 18, 1903. Serial No. 148,446.

*To all whom it may concern:*

Be it known that we, ROBERT R. THOMPSON and CHARLES F. PINKHAM, citizens of the United States of America, and residents of Boston, in the county of Suffolk and State of Massachusetts, have invented certain new and useful Improvements in Machines for Tufting Mattresses, of which the following is a specification.

Our invention relates to certain new and useful improvements in machines for tufting mattresses. Its object is to produce a device of this class which shall avoid certain disadvantages in operation which are present in the devices now in use for this and analogous purposes.

To this end our invention consists in certain novel features of construction which will be explained in the course of this specification and which are clearly illustrated in the drawings.

The mechanism herein illustrated and described consists, primarily, of two sets of devices coöperating together to produce a single result—namely, that of tufting mattresses. These two sets of devices are, first, the mechanism for compressing the mattress, sewing the twine through it, clamping one end of the twine during a portion of the sewing operation, cutting off the twine and releasing the mattress, and the mechanism for forming the tufts and feeding them into place at the proper times, and, second, the mechanism for tying the knot which holds the twine in position. Each of these mechanisms is believed to possess certain novel features.

It will be noted that the first set of devices mentioned appertains, generally speaking, to the operation of the machine as a whole. In fact, the most noticeable characteristics are given the machine on account of the peculiarities of this set of devices.

The novel features of the second set of devices—that is, the knotter—are specifically claimed in an application filed on even date herewith and allotted Serial No. 148,445. Inasmuch, however, as certain of the claims on the machine as a whole necessarily include an operative knotter generally, we have illustrated in the drawings and will describe in detail the devices which are intended to coöperate most successfully with the other features of the combination. It is not to be understood, however, that we consider ourselves in any way limited as far as this application is concerned to the use of this particular knotting device in the combination, for it will be perfectly obvious from the description that any operative knotter can be substituted for the one here described.

The invention is fully described in the specification and illustrated in the drawings furnished herewith, in which—

Figure 33:
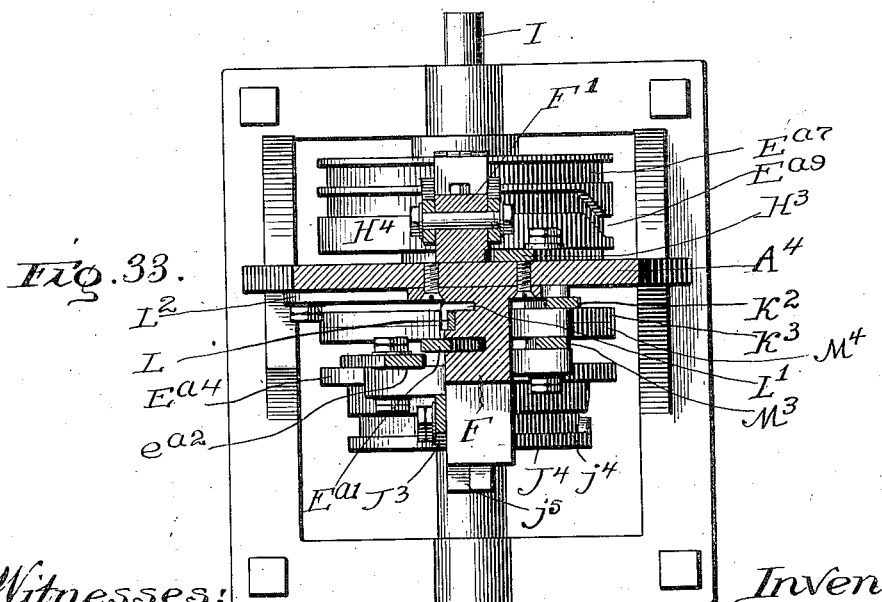
Figure 34:
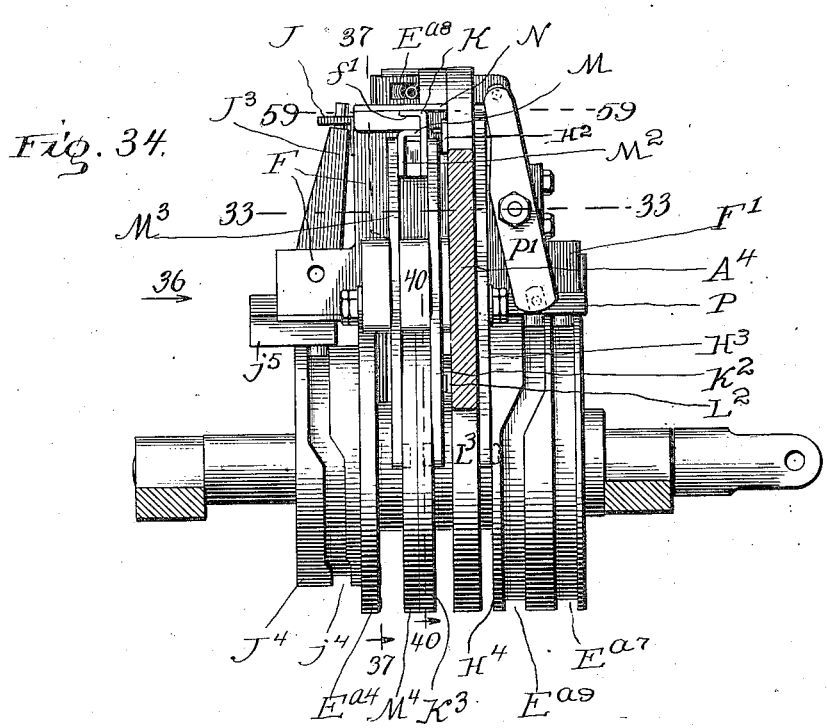
Figure 35:
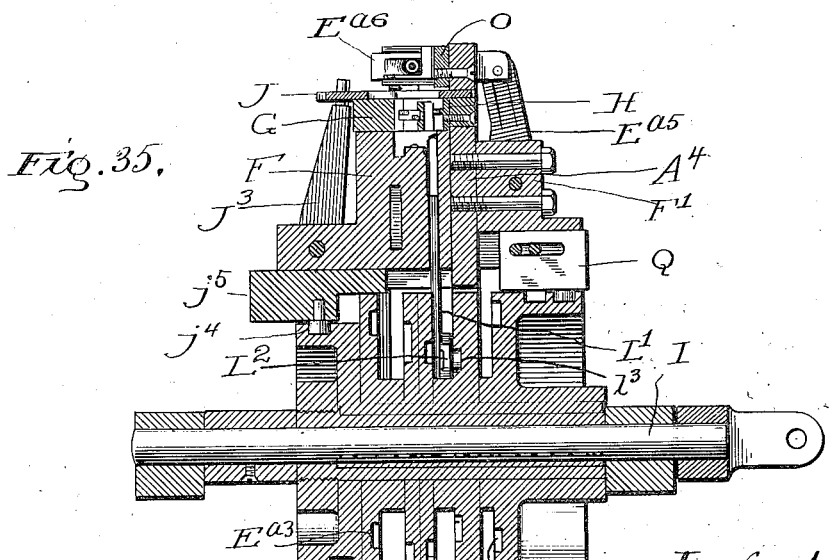
Figure 38:
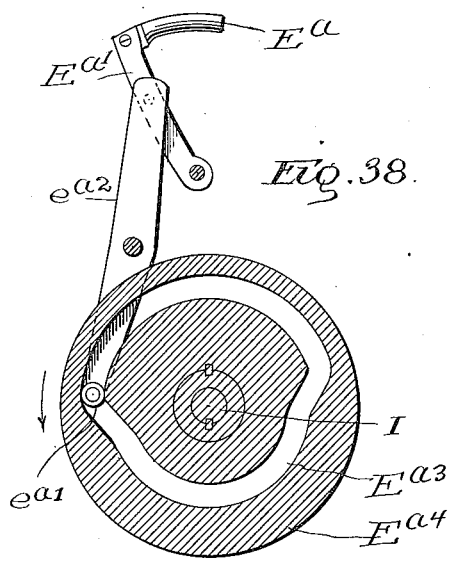
Figure 39:
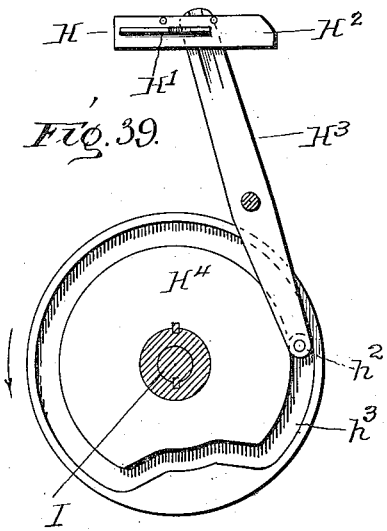
Figure 40:
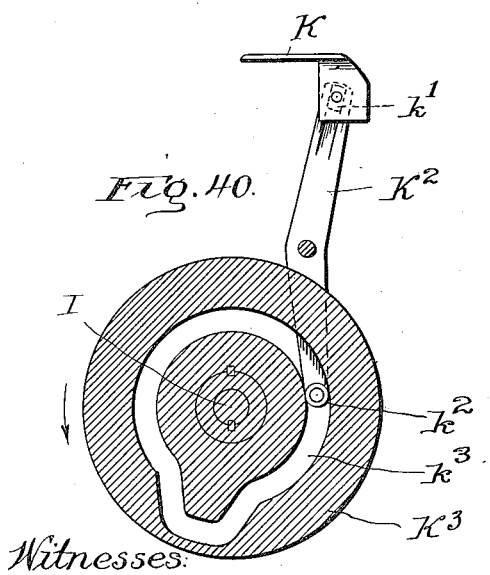
Figure 41:
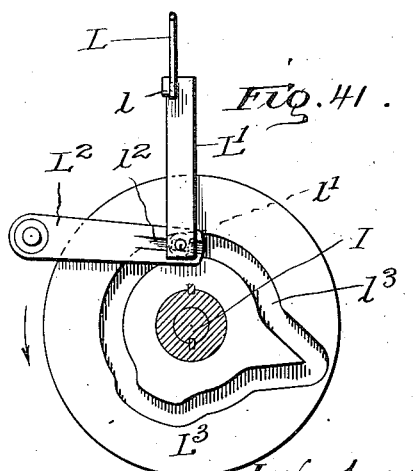
Figure 42:
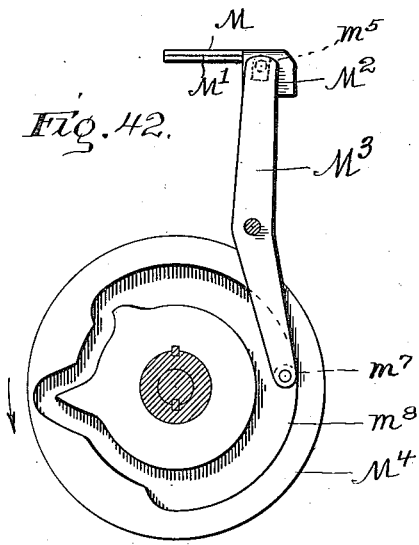
Figure 43:
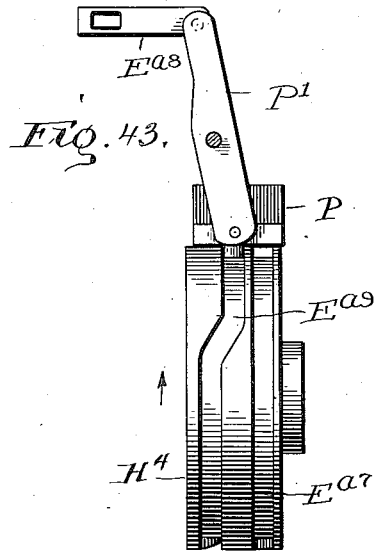
Figure 44:
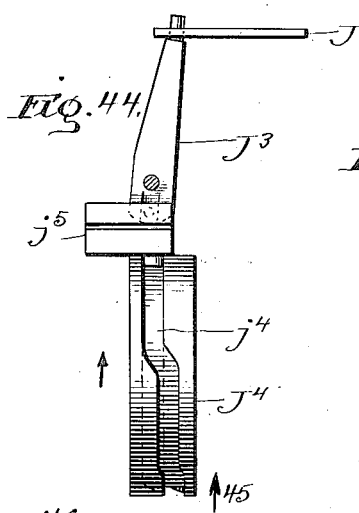
Figures 45, 47:
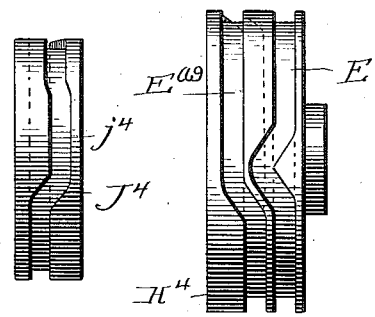
Figure 46:
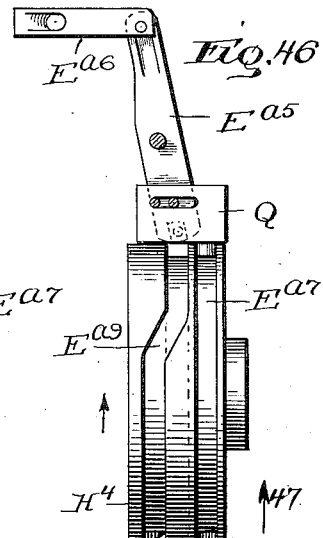
Figure 68:
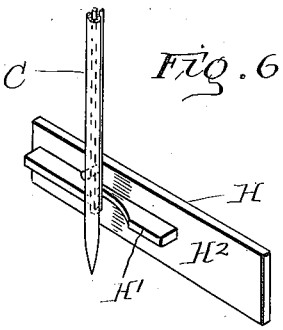
Figure 69:
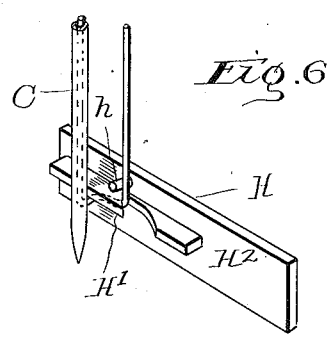
Figure 70:
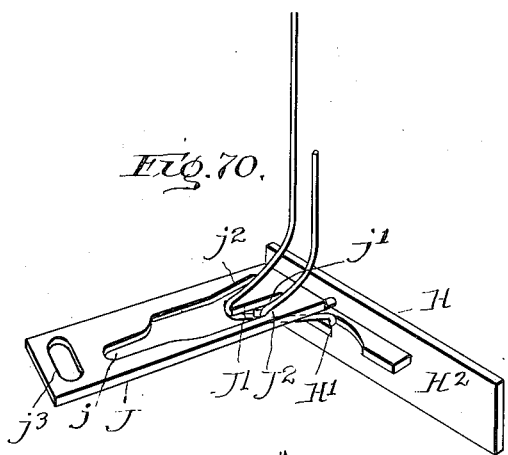
Figure 71:
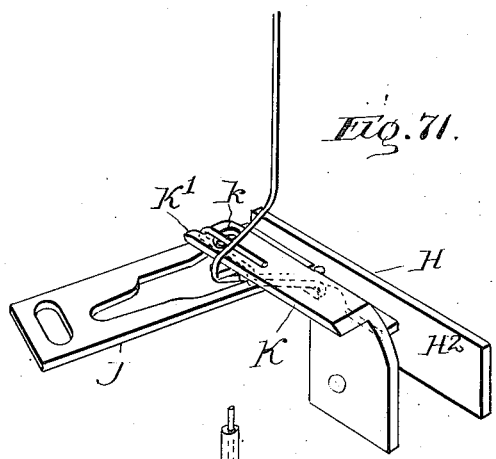
Figure 72:
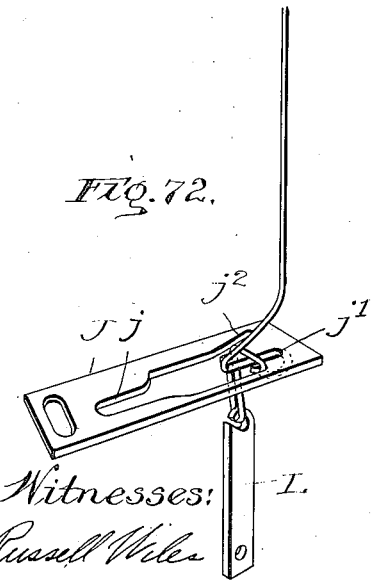
Figure 73:
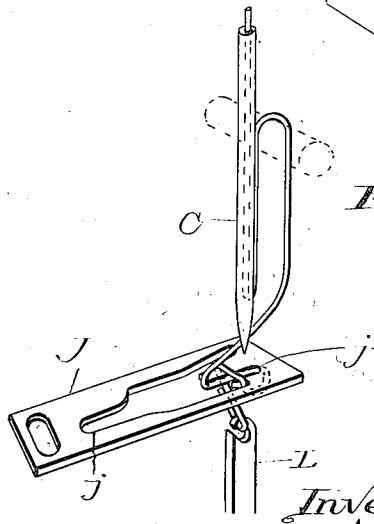

Figure 1 is a side elevation of the complete machine, the operating parts being in a position at which the compressor is stationary and at its upper position just prior to descending to compress a mattress. Fig. 2 is a side view of the lower portion of the machine, the view being in a direction opposite to that in which Fig. 1 is seen. Fig. 3 is a face view of the needle-operating cam and parts actuated directly thereby, the view being in the same direction as Fig. 1. Fig. 4 is a face view of the compressor and needle-bar-shifter-operating cam, together with the parts actuated directly thereby, the direction of the view being the same as Fig. 2. Fig. 5 is a vertical cross-section taken in the line 5 5 of Figs. 1 and 2 looking in the directions of the arrows. Fig. 6 is a detail side elevation of a connecting-block used upon the ends of the compressor and needle-bar-shifter rods. Fig. 7 is a front or face view of the upper compressor-head. Fig. 8 is a side view of the parts seen in Fig. 7, the view being in the direction indicated by the arrow 8 in Fig. 7. Fig. 9 is a central vertical longitudinal section of the upper compressor-head, the line of section being indicated at line 9 9 of Fig. 7, certain portions being seen in side elevation. Fig. 10 is a similar view with the needle-bar guide shifted to its second position. Fig. 11 is a vertical cross-section through the upper compressor-head, taken in the line 11 11 of Fig. 8. Fig. 12 is a horizontal section taken in the line 12 12 of Fig. 9. Fig. 13 is a perspective view of the needle-guide. Fig. 14 is a perspective view of the shifter-bar guide. Fig. 15 is a perspective view of a shifter-bar. Fig. 16 is a central vertical longitudinal section through the upper and lower compressor-heads, the line of section through the upper head being indicated at 9 9 in Fig. 7 and that through the lower head in line 16 16 of Fig. 36, the position of the working parts being that just prior to the cutting of the twine after the knot has been formed. Fig. 17 is an under plan of the compressor. Fig. 18 is a perspective view of the upper tuft-cutting knife and a portion of its operating-lever, the two parts being slightly separated to better illustrate the means of connection between the two. Fig. 19 is a perspective view of the twine-cutting knife and the bell-crank lever which supports it. Fig. 20 is a view, partly in front elevation and partly in vertical cross-section, the line of section being indicated at 20 20 in Fig. 8, illustrating the upper tuft-inserting mechanism, the upper compressor being in a position intermediate that shown in Fig. 21 and its lowest position. Fig. 21 is a similar view, but showing the upper compressor in its upper position. Fig. 22 is a view of a portion of the upper compressor-head, illustrating the upper tuft-clamping lever, the view being partly in side elevation and partly in vertical cross-section, the line of section being indicated at 22 22 in Fig. 7. Fig. 23 is a similar view, but showing the compressor moved downward a slight distance and said upper tuft-clamping lever in the position for clamping the tuft. Fig. 24 is a view illustrating the upper tuft-cutting knife and the mechanism operating the same, the view being partly in side elevation and partly in vertical cross-section, the line of section being indicated at 24 24 in Fig. 7, the direction of view being opposite to that seen in Figs. 22 and 23. Fig. 25 is a view of the same parts, the compressor having been moved downward a short distance—namely, to one in which the tuft has just been severed. Fig. 26 is a face view of the cam which operates the upper tuft-clamping lever. Fig. 27 is a similar view of the cam which operates the tuft-feeding lever. Fig. 28 is a similar view of the cam which operates the upper tuft-severing knife, the position of the rollers which are directly actuated by these cams being in the position assumed when the compressor is in the position illustrated in Figs. 1, 7, 8, and 21. Fig. 29 is a horizontal section taken in the line 29 29 of Figs. 7 and 8. Fig. 30 is a detail horizontal section taken in the line 30 30 of Fig. 21. Fig. 31 is a similar section in the line 31 31 of Fig. 20. Fig. 32 is a plan view of the knotting mechanism. Fig. 33 is a similar view, partly in horizontal section, the line of section being indicated at 33 33 in Figs. 34 and 36. Fig. 34 is a view of said knotting mechanism in side elevation, the supporting-frame being cut away in the line 34 34 of Fig. 32. Fig. 35 is a central vertical longitudinal section taken through the line 35 35 in Figs. 32 and 37. Fig. 36 is a front view of the knotting mechanism looking in the direction of the arrow 36 in Figs. 32 and 34. Fig. 37 is a central vertical cross-section taken in line 37 37 of Figs. 32 and 34, the parts back of the line of section appearing in front elevation. Fig. 38 is a view of the cam for operating the lower tuft-inserting tube, the cam, the pivots of the lever and tube being shown in vertical section, the line of section being indicated at 38 38 of Fig. 32. Fig. 39 is a face view of the cam operating the hook for clamping the end of the twine when the needle makes its first descent. Fig. 40 is a view of the cam which operates the end-crosser, the cam being shown in section and the line of section indicated at 40 40 in Fig. 34. Fig. 41 is a face view of the cam which operates the end-hook. Fig. 42 is a similar view of the cam which operates the gripping-hook. Fig. 43 is a side view of the cam which operates the lower tuft-clamping bar. Fig. 44 is a similar view of the cam which operates the shifter-plate. Fig. 45 is a view of the cam seen in Fig. 44 looking in the direction of the arrow 45. Fig. 46 is a view similar to Fig. 44 of the cam for operating the lower tuft-severing knife. The cams shown in Figs. 38, 39, 40, 41, and 42 are numbered consecutively in the order in which they operate in a cycle of operation of the machine. Fig. 47 is a view of said cam looking in the direction of the arrow 47 in Fig. 46. Fig. 48 is a detail vertical cross-section taken in the line 48 48 in Fig. 32. Fig. 49 is a detail vertical longitudinal section taken in the line 49 49 of Fig. 48. Fig. 50 is a side view of a block which supports certain levers and knot-forming mechanism, the view being taken in the direction indicated by the arrow 50 in Fig. 48. Fig. 51 is a perspective view of the end-crosser. Fig. 52 is a similar view of the hook part of the end-gripper. Fig. 53 is a similar view of the spreader which forms a part of the end-gripper. Fig. 54 is a detail vertical cross-section taken in the line 54 54 in Fig. 49, illustrating the manner in which the end of the twine is clamped upon the first descent of the needle. Fig. 55 is a detail vertical cross-section through the line 55 55 of Fig. 56, but showing the parts in a position after which the end of the twine has been caught by the end-hook. Fig. 56 is a detail vertical longitudinal section taken in the line 56 56 of Fig. 48. Fig. 57 is a detail plan view of a guide-plate. Fig. 58 is a perspective view of the end-hook and a part of the rod which reciprocates it. Fig. 59 is a detail horizontal section taken in the line 59 59 of Figs. 34, 48, and 49 and showing the parts in the position occupied when the compressor is in its upper position. Fig. 60 is a view similar to Fig. 59, but showing the clamping-hook, shifter-plate, and end-crosser in different positions. Fig. 61 is a view similar to Fig. 59 with the shifter-plate, end-crosser, and gripping-hook removed. Fig. 62 is a detail horizontal section taken in the line 62 62 of Fig. 48. Fig. 63 is a perspective view of a block which guides certain of the knotting mechanism. Fig. 64 is a detail horizontal section taken in the line 64 64 of Fig. 48. Fig. 65 is a view similar to Fig. 62, but showing the gripping-hook in a different position. Fig. 66 is a detail vertical longitudinal section in the line 49 49 of Fig. 48, showing the needle and twine at its lowest position in its first descent. Fig. 67 is a similar view showing the needle in the lowest position of its second descent. Fig. 68 is a skeleton perspective view of the needle and end-hook before the hook has been moved to the right to clamp the twine. Fig. 69 is a similar view after the hook has been moved across. Fig. 70 is a similar view of the end-hook and shifter-bar, the shifter-bar having carried the two strands of the twine into a position in which the end-crosser is about to carry the end above the loop formed between the end-hook and the shifter-bar. Fig. 71 is a perspective view of the end-hook, shifter-bar, and end-crosser, showing the latter as just having carried the end across. Fig. 72 is a perspective view of the shifter-bar and end-hook, the end-hook having taken the end of the twine down through the shifter-plate. Fig. 73 is a similar view of the shifter-bar, hook, and needle, the needle being in a position descending the second time. Fig. 74 is a perspective view of the parts seen in Fig. 73 without the shifter-plate, the direction of the view being at right angles to that seen in Figs. 68 to 73, inclusive. Fig. 75 is a similar view of the parts seen in Fig. 74, together with the gripping-hook, the needle having reached its lowest position. Fig. 76 is a similar view as the gripping-hook passes between the second strand and the needle. Fig. 77 is a similar view after the hook has drawn the end of the twine between the second strand and the needle. Fig. 78 is a similar view just as the loop is being drawn around the needle, the shifter-plate having moved back to its original position; and Fig. 79 is a similar view showing the needle rising, the knot being pulled tight thereby.

Before proceeding to the detailed description of the machine a brief outline of the general mode of operation will be given in order to make the detailed description more easy to understand. The filled and untufted mattress is laid upon a table or other supporting device, below which is a stationary lower compressor-head and above which is a vertically-reciprocable upper compressor. The table itself is not shown in any of the figures appended hereto, and it is not believed to be necessary. It is a table of any ordinary construction built around and slightly below the level of the lower compressor-head. By suitable mechanism, which will hereinafter be described, the upper compressor is brought down upon the mattress at the desired point, thereby squeezing it between said upper and lower compressors. Simultaneously a tuft has been fed into place on each side of the mattress. A needle is then by suitable mechanism forced through the mattress, carrying with it the tufting-twine, the end of which hangs loose from the point of the needle. The needle pierces the mattress and enters the lower compressor-head, where the loose end of the twine is immediately clamped in place. The needle then rises, being drawn out of the mattress and leaving the strand of the twine in its path. After the needle is drawn out of the mattress a suitable device shifts the needle bodily in a plane at right angles to its length a distance of about half an inch, carrying the twine across the upper tuft. The needle then again descends, carrying a second strand of twine parallel to the first through the mattress. In the meantime the knotting mechanism has formed a loop in the first end of the twine, and through this loop the needle descends, carrying with it the second strand. The loose end of the first strand is then pulled between the needle and the second strand and below the loop of twine which has been formed by the knotter. The needle then rises, completing by its own pull the formation of the knot on the lower side of the mattress. As the needle rises it leaves behind it a third strand of twine in the mattress, and when it passes out from the top of the mattress the twine is cut off, leaving a short end of twine projecting from the top of the mattress. The needle is then shifted back to its original position, and the upper compressor rises to bring the parts to their original position. It is to be understood that the needle in making its two passages through the mattress places the twine in such manner that the tufts are secured to the mattress.

Referring now to the drawings, A is the main frame of the machine, formed, as will be seen, with a base adapted to be secured to the floor and an overhanging arm, upon the end of which is supported the upper compressor-head A'. The entire frame is therefore roughly shaped like a large letter C. To the end of the overhanging arm A' is bolted a compressor-guide $A^2$. This guide is shown in top plan in Fig. 12 and in horizontal section in Fig. 29 and in longitudinal section in Figs. 9 and 10. It will be observed from the drawings that the guide has a vertical channel throughout its entire length, the channel being restricted at the front by two plates $A^3$ $A^3$, screwed to the compressor-guide $A^2$ so as to overhang the channel.

Within the channel of the compressor-guide $A^2$ is a compressor B, vertically reciprocable therein. The said compressor B is channeled in cross-section, Fig. 29, except at the bottom, where a slightly-rounded solid end B' is provided, Fig. 17. It will be noted that the compressor is not perfectly rectilinear, but that the lower end is extended forward a slight distance. It is formed with two flanges $B^9$, guided in the channel of the compressor-guide $A^2$. The rounded end $B'$ is of such shape and size as to form a head suitable to be brought into violent contact with the fabric of a mattress, and it is this portion which comes directly in contact with and holds the mattress compressed during the sewing and knotting operations. Within the channel of the compressor is bolted a shifter-guide $B^2$. (Shown in perspective in Fig. 14.) The bolt which secures these parts together is indicated in the drawings by $b$, (see Figs. 9, 11, and 16,) said bolt passing through holes in the shifter-guide $B^2$ and through slots $B^3$ in the compressor. Two small guide-plates $b'$ are screwed to the shifter-guide, these plates extending into the slots $B^3$, so as to keep the two parts in alinement, but permitting a vertical adjustment between them. A nut $b^2$ on the bolt $b$ securely fastens the two parts together. The compressor is adjusted for use with mattresses of different thicknesses by adjusting the compressor upon the shifter-guide within the channel of the compressor, inasmuch as the motion of the shifter-guide is absolutely limited by a cam, hereinafter described, which operates to reciprocate the compressor.

The shifter-guide $B^2$, as will be noted in the drawings, is channeled from end to end, and it is placed in the compressor with the open side of the channel at the back, so that the open side of its channel is closed only by the closed side of the channel in the compressor, a rectangular perforation being then provided through the two. Two parallel horizontal channels or slots $b^3$ $b^3$ are provided upon one side of the shifter-guide $B^2$, and in these channels are horizontally guided two horizontal arms $b^4$ $b^4$, extending backward from a needle-guide $B^4$. The needle-guide is therefore vertically movable only with the compressor and shifter-guide, but is horizontally movable relative thereto—that is, movable forward and back on the machine in a plane at right angles to its length, the arms $b^4$ $b^4$ sliding in the channels $b^3$ $b^3$. Within the main channel of the shifter-guide runs a shifter $B^5$. (Shown in perspective in Fig. 15.) An elongated notch is provided at the forward edge of the shifter to allow it to move freely without interfering with the bolt $b$, which secures the shifter-guide in the compressor, and two diagonal slots $b^5$ $b^5$ (see Figs. 9 and 10) are provided, extending through it. These slots are provided, as will be seen in the drawings, at each end with short vertical spaces, each of said vertical spaces being offset with relation to the other. These slots $b^5$ engage with pins $b^6$ $b^6$, riveted in holes on the arms $b^4$ of the needle-guide. When the shifter $B^5$ is moved vertically within the shifter-guide, the needle-guide is forced forward or back, as the case may be, by engagement of the pins $b^6$ with the slots $b^5$ of the shifter. The relative positions of the parts when the shifter is up and down will be clearly seen in Figs. 9 and 10, the shifter being down and the needle-guide in consequence drawn back, as in Fig. 9, which is the position in which it first passes through the mattress in a cycle of operation and the shifter being up and the needle-guide consequently being thrown forward, as in Fig. 10, which is the position occupied by the needle during the passing of the latter through the mattress in carrying the second strand to the end of the first.

The front face of the needle-guide $B^4$ is channeled to receive a vertically-reciprocable needle-bar $C'$, the said needle-bar being held in place within the channel in the needle-guide by means of plates $b^7$, secured to the face of the needle-guide $B^4$ and overhanging the channel therein. (See Fig. 12.) To the needle-bar $C'$ is secured a steel spring $c$, held in place by a screw $c'$, the two being adapted to act as a tension device for the twine. The twine passes under the ends of the spring and about two pegs $c^2$, Fig. 16, in the ordinary manner, and the amount of tension upon the twine can be regulated by the screw $c'$. In the bottom of the needle-bar is secured a hollow needle C. The twine after passing through a suitable guiding-eye $c^3$ and under the tension device heretofore described enters a perforation $c^4$ in the top of the needle and passes out through a perforation $c^5$ in the point thereof. The device by which the motions of these main parts of the upper portion of the mechanism is synchronized will now be described.

As will be obvious from the preliminary sketch of the operation of the machine, the cycle of operation is substantially as follows: The compressor descends, the needle-guide being in its rear position—that is, in the position shown in Fig. 9—wherein the shifter is lowered. When the compressor reaches the end of its stroke and the mattress is sufficiently compressed, the needle-bar descends, sliding through the needle-guide and forcing the needle through the mattress, the needle passing through a suitable perforation provided for the purpose in the solid rounded end of the compressor. When the needle reaches its lower position, the twine is clamped and the needle-bar is drawn up, leaving the twine in the mattress. The shifter is then raised, throwing the needle forward over the upper tuft, as heretofore described, after which the needle is again forced downward through the mattress, but in a new place. The knotting device then operates to complete the knot, the needle-bar is raised, the shifter is again lowered, and the compressor is raised. It is obvious, of course, that many devices might be constructed to synchronize these parts, so as to move with this cycle of operation. The preferred form, however, is shown in Figs. 1 to 6 in the drawings.

A driving-pulley $a$ upon a shaft $a^{22}$ is journaled in bearings on the machine, which pulley drives, by means of a pinion fast upon the other end of the shaft, two cam-wheels $a'$ $a^2$ on opposite sides of the machine, the cam-wheel $a^2$ having teeth upon its periphery meshing with the pinion. The cam-wheel $a'$ is provided with a cam-groove $a^3$, which engages with a roller $a^4$, mounted on the lower end of a compressor-rod $a^5$, said rod being kept in a substantially vertical position by a lever $a^7$, journaled on the frame of the machine. The upper edge of the rod $a^5$ is connected to a walking-beam lever $a^8$, journaled upon the overhanging arm A' of the frame, said walking-beam lever $a^8$ being connected by a link $a^9$ to the shifter-guide, and consequently to the compressor. It will be noted, therefore, on account of the shape of the cam-groove $a^3$ that as the wheel $a'$ revolves the compressor will be forced down, held down for a considerable time, then raised, held up for a short time, and then again sent down, and so on.

Two cam-blocks $a^{10}$ $a^{11}$ on the cam-pulley $a'$ coöperate with a roller $a^{12}$ to reciprocate the shifter at the proper time, the connection with the shifter being made through a rod $a^{13}$, a walking-beam lever $a^{14}$, and a link $a^{15}$. The rod $a^{13}$ is kept in a substantially vertical position by the same lever $a^7$ which keeps the rod $a^5$ in a vertical position, but, as will be seen in Figs. 5 and 6, the rod $a^{13}$ is free to move vertically independently of the rod $a^5$. To the lower ends of the rods $a^5$ $a^{13}$ are secured suitable end pieces or blocks, one of which is guided to slide upon the other to permit such independent movement.

The other cam-wheel $a^2$ on the opposite side of the machine is provided with a single cam-groove $a^{16}$, in which runs a roller $a^{17}$, mounted on the end of a needle-reciprocating rod $a^{18}$, which is kept substantially vertical by a lever $a^{19}$, pivoted to the frame of the machine, as is the lever $a^7$ on the opposite side of the machine. The upper end of the rod $a^{18}$ is connected to a third walking-beam lever $a^{20}$, which is in turn connected by a link $a^{21}$ to the needle-bar. The shape of the cam-groove $a^{16}$ in the cam-wheel $a^2$ is such that the needle-bar descends to the very bottom of its limit of movement, makes a very slight rise to ease the twine, then rises to a considerable distance to pull out through the mattress and over the upper tuft, again descends, making the same slight rise to ease the twine, and again ascends through the mattress, then remaining up for a considerable period.

We shall now proceed to describe the mechanism by which the twine is cut off after the knot is formed. To the lower part of the compressor and on the inside of the right-hand wall of the channel is pivoted a bell-crank lever D, (see Figs. 16 and 19,) to the lower end of which is secured a knife D', extending therefrom at right angles. This knife is arranged to coöperate with a spring-steel plate $D^2$, secured to the block in the foot of the compressor, and which is perforated to permit the needle to pass through. The arrangement is such, as will be seen in Fig. 16, that if the bell-crank lever D is rotated upon its pivot, so as to swing its lower end forward, the twine will be caught between the knife D' and the edge of the perforation in the spring-steel plate $D^2$ and be cut off. The bell-crank lever D is connected to a link $D^3$, the upper end of which is connected to a lever $D^4$, pivoted on the compressor. A lug $d$, Fig. 7, upon this lever $D^4$ extends past the front of the needle-guide and is in position to be engaged by a lug $C^2$ on the needle-bar when said needle-bar is moved upward the second time in the cycle of operation—viz., at the completion of the tying operation. A spring $d'$ holds the parts in the position shown in Figs. 7 and 16, wherein the link $D^3$ is pulled down and the knife is back as far as possible, the movement of the parts being limited by a pin $d^2$ on the compressor engaging with the lever $D^4$. When the needle-guide is in its forward position, as it is when the knotting operation is finished and the twine is to be severed, the needle-bar is raised and the lug $C^2$ engages with the lug $d$, then raising the link $D^3$, swinging the knife forward, and cutting the twine. During the first reciprocation of the needle the cutting mechanism is not operated, first, because the needle-bar is not raised high enough, and also because when the needle-guide is in its rear position the lug $C^2$ cannot engage with the lug $d$. The distance which the needle has to rise before the twine is severed is determined by the length of twine necessary to tie the knot. The loose end left when the twine is severed must be long enough to afford material for the knot and to extend through all the parts of the knotting mechanism at the same moment, while, on the other hand, it must not be so long as to be incapable of being eventually entirely pulled through the loop by the knotting mechanism.

The device which forms and feeds the tufts into position will now be explained. Two of these devices, of course, are provided, one for each side of the mattress. The one at the top will be described in detail. The two devices are similar in all essential principles; but the one at the top is operated by vertical cam-slots which actuate the tuft former and feeder as the compressor is moved up and down, while the device at the bottom is actuated by circular cams which are mounted upon and driven by the same shaft that drives the knotting and twine - clamping mechanisms. The tufts of our device are not merely fed into place as are the tufts used in most other machines, but they are made up from the raw materials in the machine, left in place, and then sewed down. The tufts are cut from a continuous piece of twisted worsted which is fed forward by mechanism now to be described.

To the lower part of the compressor is pivoted a lever E', (see Figs. 7, 8, 20, 21, and 29,) which bears at its end a tuft-feeding tube E, circular in cross-section and bent, preferably, into the form of an arc of a circle. The lever E' is so arranged that the tuft-feeding tube E may be swung in through an opening provided in the side of the lower part of the compressor, so as to lie across the center of the compressor immediately between the two holes provided in the bottom thereof for the passage of the needle in its two downward movements. The tuft-feeding tube in this position is shown in Figs. 21 and 30. The lever E' approximately at its junction with the tube E is provided with a pivoted block $e$, engaging with a slot in a lever $E^2$, said lever being pivoted upon a bracket extending laterally from the compressor. The upper end of this lever $E^2$ bears a roller $e'$, adapted to engage with the vertical cam-groove $E^3$, formed in a block $E^4$, secured to the compressor-guide. This cam-groove $E^3$ is so arranged that when the compressor is raised the tuft-feeding tube E is swung into the bottom of the compressor, as shown in Fig. 21, while when it is lowered the tube is drawn out, as shown in Fig. 20.

A lever $E^5$, Figs. 24 and 25, is pivoted on the inside of the right-hand wall of the channel in the lower part of the compressor. To the lower part of this lever $E^5$ is connected a horizontally-reciprocable tuft-cutting knife $E^6$. The knife is guided in a horizontal perforation provided for the purpose in a block $B^a$, secured in the lower part of the compressor. This knife $E^6$ is provided with a hole of such diameter as to permit the tuft-feeding tube E to pass through it, and a plate $e^3$, Figs. 24 and 25, having a hole adapted to register with the hole of the knife, is provided in the block at the foot of the compressor. When the hole of the movable knife is in registration with the hole in the plate $e^3$, the tube can be swung into the position shown in Fig. 21, and when the tube is removed a clean cut may be made through any substance left behind by merely reciprocating the knife. The connection between the lever $E^5$ and the tuft-cutting knife $E^6$ is made by a block pivoted to the knife and running in a groove in the lower part of the lever. (See Fig. 18.) The upper end of the lever $E^5$ is provided with a roller $e^2$, running in a cam-groove $E^7$ on the side of the block $E^4$. This block $E^4$, it will be seen, is provided on two sides with cam-slots, the front of these slots (operating the feeding-tube) being shown in Fig. 27 and the side slot being shown in Fig. 28. The arrangement of this side slot $C^7$ is such that when the compressor is brought down the knife will remain stationary until the end of the stroke through the cam is nearly reached, when it will be reciprocated very quickly and returned to its original position.

Upon the opposite side of the compressor from the knife is pivoted a clamping-lever $E^8$, (see Figs. 22, 23, 30, and 31,) provided with a blunt lower end adapted to coact with a slot $e^4$, cut in the block, secured in the bottom of the compressor. The upper end of this lever is in engagement with a cam-groove on the inside of a block $E^9$, secured upon the left-hand side of the compressor-guide. This cam-groove is shown in Fig. 26, and the arrangement is such that as the compressor comes down the lower end of the clamping-lever is swung backward into the slot $e^4$ and held there for a considerable time, then released.

The operation of the whole tuft forming and feeding mechanism will be apparent. As the compressor rises from the lower position to its raised position the tuft-feeding tube is swung forward. Then as the compressor comes down the lower end of the clamping-lever is first swung backward, so as to clamp the short end of the worsted, which projects from the tuft-feeding tube. As the compressor moves on down the tuft-feeding tube is swung back from the position shown in Fig. 21 to the position shown in Fig. 20, leaving behind a sufficiently long piece of material to form a tuft. The knife is then quickly reciprocated, making a clean cut through the worsted and leaving only a short loose end sufficient for the clamper to take hold of, and finally the clamper is released, leaving a short length of worsted to be operated upon lying, as does the strand shown, at the bottom of the block in Fig. 20. As the needle comes down the first time it passes upon one side of the tuft. As it comes down the second time it passes upon the other side of the tuft, forming a loop over the same and drawing the same through a hole $e^5$, provided for the purpose in the bottom of the compressor. In other words, the twine is looped over the middle of the roughly-cylindrical tuft, pulling it through the bottom of the compressor, after which the loop secures the tuft to the mattress. The operation of the lower tuft former and feeder, as heretofore said, is precisely the same as this except that the necessary reciprocations are produced by circular cams mounted on the knotter-shaft instead of by the cam-slots, made to perform their work by the reciprocation of the compressor. The differences will become apparent in the subsequent description of the knotter and knotter-operating cams.

Referring now to the knotting mechanism, some brief description of the general form of the knot tied and the motions by which the tying is accomplished will first be given, and for this purpose reference will be had to Figs. 68 to 79, inclusive, which show diagrammatically the formation of the knot. It will be remembered that before the needle C moves down it has hanging loose from its point a short end of twine. When the needle enters the lower part of the machine, the construction of which will presently be described, this loose end of twine is left in the mattress extending upward, and that part entering the needle is grasped by a clamping-hook H and carried bodily sidewise, so that the two strands of twine—that is, the strand in the needle and the loose end—are vertical, parallel, and some slight distance apart, both being in a plane transverse to the overhanging arm of the frame. When the parts reach the position indicated in Figs. 54 and 69, the needle ascends, leaving behind it the two approximately parallel strands, after which the said two strands are moved forward in the machine by a shifter-plate J, the loose end being carried forward a less distance than the main strand left behind by the needle, Fig. 70. It will be noted that this leaves the twine in the form of a roughly-U-shaped loop which is approximately horizontal, the bend in the loop being held by the clamping-hook H. The loose end of the twine is then carried across the upper part of the U-shaped loop, as shown in Fig. 71, by an end-crosser K, and it is then pulled downward on the opposite side thereof by an end-hook L to form a vertical strand. Thus it will be seen is formed a circular horizontal loop terminating in a short vertical strand at one end and terminating at the other end in the main strand left behind by the needle. When the parts reach this position, Figs. 73 and 74, the needle descends again, passing through this loop, Fig. 75, and carries with it the second main strand. When the point of the needle has passed completely through the loop, a gripping-hook forces its way between the needle and the second strand, Fig. 76, grasps the loose end of twine, and pulls it back between the needle and the second main strand, Fig. 77. The needle then rises and completes the knot, as shown in Fig. 79. The form and structure of the knot and the movements necessary to produce this knot will be apparent from these drawings. There are five moving parts besides the needle—the clamping-hook, which first grasps the loose end of the twine; the shifter-plate, which bodily shifts the loose end and the first strand of twine; the end-crosser, which pushes the loose end over the U-shaped loop, making the loop circular; the end hook, which pulls down the loose end of the twine after it has passed over the U-shaped loop, Figs. 72, 73, and 74, and the gripping-hook, which pulls the loose end of the twine between the needle and the second main strand. Each of these parts is cam-operated, and the structure of each part and of the parts surrounding it will now be described in detail.

To the frame of the machine is secured a vertical plate $A^4$, terminating at the top in a curve. This plate $A^4$ together with all the parts of the lower compressor-head are covered by a sheet-metal casing, Figs. 1 and 3; but the upper curved edge of the plate serves to support and stiffen this casing, and to all intents and purposes it is the part which coacts with the reciprocable upper compressor to compress the mattress. To the front of the plate $A^4$ is bolted a block F, the purpose of which is to serve as a support for certain levers and as a guide for certain moving parts. A square-bottomed channel or depression $f$ (see Figs. 36, 37, and 48) is cut in the top of this block F, in which channel is placed a block G, Fig. 63, which serves to guide various devices which act directly upon the twine in forming the knot and which are shown in Figs. 68 to 79, inclusive.

It will be noted that two perforations $g\,g'$, Fig. 63, are provided for the needle to pass through this block in its two trips through the mattress. At the rear of the block is provided a horizontal groove $g^2$, in which runs the clamping-hook H, heretofore referred to. This clamping-hook, it will be noted, has two main portions—a vertical plate $H^2$ and a horizontal hooked portion $H'$, which slides in the slot $g^2$. The hook proper on the portion $H'$ is so positioned that as the clamping-hook is horizontally reciprocated the hook proper will slide past the needle when in the perforations $g$ and engage with the loose end of the twine, as shown in Figs. 54 and 69, pull it sidewise, and clamp it against a solid portion of the block G. The clamping-hook H is assisted by a pin $h$, projecting therefrom, in carrying the twine from the needle to the end of a vertical slot $g^3$, cut at the rear end of the block G, where it holds the twine above the shifter-plate. The relation of the clamping-hook to the block G is clearly shown in Fig. 54, where the parts are shown as clamping the piece of twine in the ordinary way. The reciprocation of the clamping-hook at the proper times is secured by a lever $H^3$, (see Fig. 39,) pivoted upon the rear of the plate $A^4$, said lever being grooved at its upper end to engage with a small block $h'$, pivotally secured to the rear of the clamping-hook H. The lower end of the lever $H^3$ is provided with a roller $h^2$, which runs in a cam-groove $h^3$ in a circular cam $H^4$, said cam being mounted upon a shaft I, journaled in the frame of the machine and extending underneath the plate $A^4$, said shaft running from front to back in the machine. It will be noted that the arrangement of the cam-groove $h^3$ is such that the clamping-hook will be drawn to the right for only a short portion of the revolution of the cam, it being held to the left for the remainder of the operation—that is to say, the hook goes over to the right and clamps the twine for a short time and is immediately returned to its original position.

The shifter-plate J, heretofore referred to, consists of a single sheet of metal running in a horizontal guide $g^4$ (see Figs. 48, 61, and 63) in the block G, the direction of this guide being such that the shifter-plate can be reciprocated from front to back of the machine, but in a slightly diagonal direction, Figs. 59 and 60, to bring the main strand upon the proper side of the hole $g'$. The shifter-plate is, it will be seen, provided with a fork J' and a hook $J^2$, (see Fig. 59,) which are adapted to engage with the first main strand of the twine and with the loose end thereof, respectively, as shown in Fig. 70. The fork and hook or other equivalent devices are the essential features of this plate. The perforation is made of the peculiar shape shown simply in order that it may reciprocate the desired distance and still avoid all the other moving parts of the machine. The notches in the main perforation (indicated by $j$ $j'$) are made to enable the plate to avoid the needle on its second downward trip, and the notch indicated by $j^2$ is made to enable the shifter-plate to avoid the end-hook when it comes up to grasp the loose end. The shifter-plate J is reciprocated by means of a lever $J^3$, pivoted to the block F, Figs. 35, 36, and 44, the upper end of this lever engaging with the perforation $j^3$ in the shifter-plate J and the lower end being pivoted upon a sliding block $j^5$, guided in the block F, and provided with a roller running in a cam-groove $j^4$ in the periphery of a cam $J^4$, mounted upon the shaft I. This cam-groove is so formed as to draw the shifter-plate forward a certain distance, hold it in place for a moment, draw it still farther forward, and finally return it to its original position. The purpose of this two-stepped movement is to cause the shifter-plate to draw the loose end and the first main strand forward, the loose end lagging behind the main strand, as heretofore pointed out in the general description, until the point is reached where the end-crosser engages with the loose end. A slight pause is made at this point to enable the end-crosser to carry the twine across, behind the needle, and over the loop, after which the shifter-plate moves on, so as to carry the strand which lies on the hook $J^2$ and fork J' of the shifter-plate in front of the needle, so as to make a loop around the latter.

The next part to be considered is the end-crosser K. The end-crosser, unlike the parts heretofore mentioned, is not guided in the block G at all, but slides over the top of the same and over the top of the shifter-plate, Figs. 59 and 60, and it is guided in a horizontal transverse guideway $f''$ in the block F. It is provided at one end with a horn K', which engages the loose end, as heretofore pointed out, and with a perforation $k$, which is made simply to permit the end-hook to rise and grip the loose end of the twine. The reciprocation of the end-crosser is effected by a lever $K^2$, pivoted between suitable ears on the block F, the upper end of this lever being grooved to engage with a block $k'$, Figs. 59 and 60, pivoted to the end-crosser, and its lower end being provided with a roller $k^2$, running in a cam-groove $k^3$ in a circular cam-wheel $K^3$ on the shaft I. This cam is so arranged that the end-crosser makes a single quick reciprocation to the left, returning almost immediately to its original position, which is at the right, as shown in Fig. 59. This reciprocation merely forces the loose end of the twine across the U-shaped loop and holds it there long enough for the end-hook to take hold, and the reciprocation is timed to occur while the shifter-plate is at its intermediate position and holding the loose end in the proper position to be engaged by the horn K' on the end-crosser.

The end-hook L is shown in skeleton in Figs. 72 to 76, inclusive. Its form is apparent from the drawings, and its purpose is quite plain from the general description and from the skeleton views. The means by which its reciprocation is effected is illustrated in Fig. 41. A connecting-rod L' (see Figs. 48, 49, 50, and 58) is vertically guided in a groove in the block F. The upper end of this connecting-rod is provided with an ear $l$, which is pivoted to the end-hook L. The lower end of the connecting-rod is provided with a block $l'$, running in a groove $l^2$ in a lever $L^2$, pivoted upon the plate $A^4$. The lever $L^2$ is provided with a roller engaging with the cam-groove $l^3$ in a circular cam $L^3$, mounted upon and driven by the shaft I. This cam-groove is so shaped that the end-hook makes one very quick vertical reciprocation from its lowest to its highest point and subsequently makes a second very slight upward reciprocation. The purpose of the first reciprocation is evident from the preliminary description—namely, that of drawing down the end of the twine which has been carried across by the end-crosser. The second slight reciprocation is made at the time that gripping-hook is retracted from position shown in Fig. 76 to release the end of twine and allow the gripping-hook to carry the end by the needle and through the loop.

The connecting-rod L' is guided, as before stated, in a groove in the block F, Figs. 33 and 50, and the ear $l$ projects around a corner of the block and runs in a groove at right angles to the first groove. The connecting-rod is held in place by a plate of metal $f^2$, Figs. 48 and 50, This, it will be seen, keeps the connecting-rod in a vertical position and guides the lower end of the end-hook. The upper end of the end-hook is guided in a perforation in the block F and when it rises passes through a vertical guideway $g^5$ in the block G.

The gripping-hook, which is the last of the moving parts of the knotter to operate, is shown in skeleton in Figs. 75 to 79, inclusive, and its construction is shown in detail in perspective in Figs. 52, 53, 62, 63, and 64. It consists of a hook M, provided with a suitable end $m$, adapted to grasp the twine, and a spreader M′, pivoted to the under side of the hooked member M. The relations of the parts when in position is shown in Fig. 65. The upper portion M reciprocates laterally through a flat rectangular perforation $g^6$ in the block G, this motion being purely and simply reciprocatory. The spreader M′, it will be noted, consists of a point $m'$, a straight portion $m^2$, and an offset portion $m^3$, connected to said straight portion by a diagonal web $m^4$, Figs. 53 and 64. This spreader runs between two pointed cams $g^7$ $g^7$, which are placed at the entrance of the lower portion of the perforation $g^6$ in the block G. These cams are so positioned that as the gripping-hook is forced to the left in its lateral reciprocation the spreader-hook will run along with its point in line with the point of the upper portion M until the two points come between the needle and the twine—that is, just beyond the position shown in Fig. 75. As the inward or left-hand reciprocation is continued the forward cam $g^7$ engages with the diagonal portion $m^4$ on the spreader, forcing the point $m'$ backward in the machine and away from the point of the hook M, Fig. 65. This separates the strand of twine from the needle and produces a fairly large size loop, Fig. 76, through which the entire end of the gripping-hook passes readily. The loose end of twine which is held down by the end-hooks L is then caught, as heretofore explained, by the hook $m$ on the upper portion M of the gripping-hook, and the gripping-hook is then retracted, as shown in skeleton in Figs. 77 to 79. The reverse action to that just explained then takes place—that is, the rear cam $g^7$ engages with the diagonal web $m^4$ of the spreader, forcing it into line with the upper portion M of the gripping-hook, firmly clamping the loose end of the twine between the hook $m$ and the spreader M′ and pulling it between the needle and the second main strand, as previously set forth. The means by which the reciprocation of the gripping-hook is effected is illustrated in Fig. 42. The portion M is provided with an ear $M^2$, to which is pivoted a block $m^5$, (see Fig. 37,) running in a groove $m^6$ in the upper part of a lever $M^3$, pivoted on the block F. The lower end of this lever $M^3$ is provided with a roller $m^7$, running in a cam-groove $m^8$ in a circular cam $M^4$, mounted upon and driven by the shaft I. This cam-slot is so arranged that the gripper stands normally with its point between the two holes $g\ g'$, provided for the two trips of the needle, said position being shown in Fig. 62. Immediately before the needle comes down for the second time the gripping-hook is retracted to be in position to be forced between the needle and the second main strand of twine. It is then forced forward or to the left as far as possible and immediately retracted to its extreme position, where it holds the loose end of twine, firmly clamping it, as above set forth. When the knot is completed, it is of course necessary to release the loose end to permit the mattress or other material to be tufted to be removed, and for this purpose the gripping-hook is returned to its normal position, where the point of the hook and of the spreader are separated. This completes the description of the various coacting parts which form the knot. It will be noted that all these parts are driven at the proper times by the rotation of the shaft I, which carries the various cams, and it will further be noted that it is necessary that the rotation of the shaft I shall be properly synchronized with the movements of the devices moving with the upper compressor, inasmuch as the parts coact at all times with the needle to produce the desired result. The mechanism by which this synchronous rotation is effected is shown in Fig. 2. The shaft $a^{25}$ upon the left-hand side of the machine is provided with a beveled gear $i$, in mesh with a second beveled gear $i'$ upon the end of a shaft $i^2$, journaled upon the left-hand side of the machine. This shaft $i^2$ is connected by a connecting rod or shaft $i^3$ and universal joints $i^4\ i^5$ to the end of the shaft I, thereby causing rotation of said shaft I at the proper speed to coact with the mechanism in the upper part of the device.

Upon the top of the block F and covering the central groove, a depression in which the operating parts are located is a cover N, (see Fig. 57,) which in addition to the mere function of covering the parts acts as the upper portion of the guideway for the shifter-plate and the end-crosser. The cover N is provided with a horn $n$, which assists in guiding the loose end and keeping it substantially parallel with the first main strand when moved by the shifter-plate. Above the cover N is a foot O, perforated for the two passages of the needle, the purpose of which is to provide a place for the lower tuft to lie, so that it will not be pulled down among the operating parts.

It now becomes necessary to give some brief description of the lower tufting mechanism. This mechanism is in all essential particulars a duplicate of the mechanism provided on the upper compressor-head, and similar letters of reference are given to similar parts in this lower mechanism as in the upper, except that the character "a" is affixed to the exponents of all the letters. A lever $E^{a\prime}$, which bears a tuft-feeding tube $E^a$, is pivoted to the block F and its reciprocation is effected by engagement of a block $e^a$, pivoted upon it and engaging with a groove in a lever $e^{a2}$, pivoted on the block and engaging at its lower end by means of a roller $e^{a\prime}$ with the cam-groove $E^{a3}$, formed in a cam $E^{a4}$, mounted upon the shaft I, said cam-groove being merely a circular reproduction of the cam-slot $E^3$ on the upper mechanism. In a similar way the other tuft-forming devices are mounted, the lower clamp $E^{a8}$ being mounted on the right-hand side of the foot O and guided to reciprocate in a slot extending backward and forward through the plate $A^4$ and the knife $E^{a6}$ being mounted on the left-hand side of the foot O in a similar slot and arranged to reciprocate in the same way. These reciprocations are effected by levers $P^\prime$ and $E^{a5}$, pivoted upon a block $F^\prime$ upon the rear of the plate $A^4$, these levers engaging at their lower ends with slide-blocks P Q, arranged to reciprocate forward and back under the influence of cam-grooves $E^{a9}$ and $E^{a7}$, respectively, cut in the periphery of the cam $H^4$, these grooves being merely circular reproductions of the similar slots in the upper mechanism. The operation of this lower mechanism is identical with the upper mechanism and it is timed to operate synchronously therewith. In other words, the lower tuft-feeding tube swings forward, the clamp grips the loose end of the tuft, the tube swings backward, leaving the length of tuft in place, and the knife cuts it off.

We realize that considerable variations are possible in the details of this construction, and we therefore do not intend to limit ourselves to the specific form herein set forth, except as pointed out in the claims.

We claim as new and desire to secure by Letters Patent—

1. In a device of the class described, the combination with a frame and a lower compressor-head, of an upper compressor, vertically reciprocable in the frame, a shifter vertically reciprocable in the compressor, diagonal slots in the shifter, a needle-guide horizontally movable with respect to the compressor, pins secured to said needle-guide and engaging with the slots in said shifter, whereby vertical movement of said shifter will move said needle-guide horizontally, a needle-bar reciprocable in said needle-guide, a needle secured in said needle-bar, means for reciprocating the needle-bar to force the needle through the article to be tufted, means for clamping the end of the twine on the opposite side of the article to be tufted, means for moving the shifter vertically to shift the needle-guide horizontally, means for again reciprocating the needle and means for tying a knot from the ends of the strands of twine carried by said needle.

2. In a device of the class described, the combination with a frame and a lower compressor-head, of a reciprocable compressor a shifter guided in the compressor, a needle-guide, arms on said needle-guide running in horizontal grooves in said compressor, diagonal slots in said shifter, pins on said arms engaging with said diagonal slots, whereby vertical motion of said shifter will move said needle-guide horizontally, means for reciprocating said needle-bar, means for clamping the end of the twine carried by said needle on the opposite side of the article to be tufted, means for moving said shifter to shift said needle-guide horizontally, means for again reciprocating said needle-bar, and means for tying a knot of the ends of the twine carried by said needle.

3. In a device of the class described, the combination with a frame and a lower compressor-head, of an upper compressor reciprocable in the frame, a needle reciprocable in the upper compressor, a lever pivoted to said compressor, a knife secured to said lever and a cam movable with said needle and adapted to swing said lever when said needle is raised, whereby said knife severs the strand of twine carried by said needle.

4. The combination with a frame, and a lower compressor-head, of an upper compressor reciprocable in said frame, a needle reciprocable in said upper compressor, a bell-crank lever pivoted to the lower end of said compressor, a knife secured to said bell-crank lever, and adapted to be swung across the path of said needle when said lever is actuated, a link connected to said bell-crank lever, a lug secured to said link, and a cam rigidly positioned with respect to said needle and adapted, when said needle is raised, to engage with the lug secured to said link, whereby when said needle is raised, said knife swings across the path of said needle to sever the twine carried thereby.

5. In a device of the class described, the combination with two relatively movable compressors adapted to compress the article to be tufted, means for passing two parallel strands of twine through the article to be tufted, means for tying a knot in the ends of said two strands and means for cutting the twine above the knot, of a suitable device for feeding forward a continuous strip of tuft-forming material in position for its end to be encircled by the twine, and suitable mechanism for cutting off said material to form tufts thereof.

6. In a device of the class described, the combination with two relatively movable compressors adapted to compress the article to be tufted, means for passing two parallel strands of twine through the article to be tufted, means for tying a knot in the ends of said two strands and means for cutting the twine above the knot, of a tube adapted to hold a continuous strip of worsted and a device engaging the worsted constructed and arranged to cause the same to feed through the tube into position for its end to be encircled by the twine and means for cutting off said strip of worsted to form tufts thereof.

7. In a device of the class described, the combination with two relatively movable compressors adapted to compress the article to be tufted, means for passing two parallel strands of twine through the article to be tufted, and means for tying a knot in the ends of said two strands, of means for feeding forward a continuous strip of tuft-forming material into position for its end to be encircled by the twine, means for clamping its end during the retraction of the feeding mechanism, and means for cutting off the tuft-forming material to form tufts thereof.

8. In a device of the class described, the combination with two relatively movable compressors adapted to compress the article to be tufted, means for passing two parallel strands of twine through the article to be tufted, and means for tying a knot in the ends of said two strands, of a reciprocable tube adapted to hold the end of a strand of twisted worsted and to swing the end thereof forward into position to be encircled by the twine, means for swinging the tube forward, a suitable clamping device for clamping the end of the worsted, means for automatically operating the same, means for retracting the tube, a knife adapted to cut off a length of the worsted to form a tuft thereof, and means for automatically operating the knife.

9. In a device of the class described, the combination with two relatively movable compressors adapted to compress the article to be tufted, means for passing two parallel strands of twine through the article to be tufted, and means for tying a knot in the ends of said two strands, of a reciprocable tube adapted to hold the end of a strand of twisted worsted situated on each of said compressors, mechanism for swinging said tube forward to bring the end of said strands of worsted into position to be encircled by the twine while said compressors are separated, and mechanism for clamping the worsted, retracting the tube and cutting off the worsted while said heads are approaching each other, whereby a suitably-shaped tuft is placed in position on each side of the article to be tufted when it is compressed by the two relatively movable compressors.

10. In a device of the class described, the combination with two relatively movable compressors adapted to compress the article to be tufted, means for passing two parallel strands of twine through the article to be tufted, and means for tying a knot in the ends of said two strands, of a suitable reciprocable tube adapted to grasp the end of a strand of twisted worsted, means for reciprocating said tube, a device for clamping the end of said strand when said tube is run forward, and a knife adapted to cut off a length of said worsted when said tube is retracted.

11. In a device of the class described, the combination with a frame, a stationary compressor-head, a reciprocable compressor, means for passing two parallel strands of twine through the article to be tufted, of an arm pivoted to said reciprocable compressor, a tube adapted to grasp the end of a strand of twisted worsted secured to the arm, a cam beside said compressor adapted to engage with said tube through suitable intermediate mechanism and swing it into position to bring the end of said worsted into position to be encircled by the twine as the compressor is raised and to retract it as the compressor is lowered, a suitable clamping device adapted to grasp the end of the worsted, a stationary cam adapted to actuate said device to clamp the worsted as the compressor is lowered, a suitable knife formed to cut off a section of the worsted after the tube is retracted, and a suitable stationary cam adapted to actuate said knife before the compressor reaches the bottom of its reciprocation.

12. In a device of the class described, the combination with a frame, a stationary compressor-head, a reciprocable compressor, means for passing two parallel strands of twine through the article to be tufted, of an arm pivoted to said reciprocable compressor, a tube adapted to grasp the end of a strand of twisted worsted, and to swing its end into position to be encircled by the twine as the arm is swung upon its pivot, a lever pivoted upon said compressor, engaging with said arm, a stationary cam engaging with said lever to swing said arm forward and said tube into position for the worsted to be encircled by the twine as the compressor is raised and to retract the same as the compressor is lowered, a suitable clamping device, a stationary cam adapted to actuate the same as the compressor moves down and before the tube is retracted, a suitable cut-off mechanism and a stationary cam adapted to actuate the same as the compressor moves down and after the clamping device has been retracted.

13. In a device of the class described, the combination with a frame, a reciprocable compressor, and a stationary compressor, means for passing two parallel strands of twine through the article to be tufted, and means for tying a knot in the end of said strand, of a tuft-feeding tube pivotally secured to said stationary head adapted to grasp the end of a strand of twisted worsted, and when swung upon its pivot to place the end of said strand in position to be encircled by the twine, mechanism for clamping the end of said worsted, mechanism for cutting off said worsted to form a tuft, a plurality of circular cams adapted to actuate said tube, clamping mechanism and cut-off mechanism and means for rotating said shaft to operate said devices at proper times with reference to the movements of said reciprocable compressor-head.

14. In a device of the class described, the combination with a frame, a reciprocable compressor, and a stationary compressor-head, means for passing two parallel strands of twine through the article to be tufted, and means for tying a knot in the end of said strand, of an arm pivoted to said stationary head, a tuft-feeding tube connected thereto adapted to grasp the end of a strand of twisted worsted and when said arm is swung upon its pivot to place the end of said strand in position to be encircled by the twine, a suitable device for clamping the end of said strand of twisted worsted, and a suitable device for cutting off said strand, and a plurality of circular cams and mechanism for rotating said cams to operate said devices at the proper time with reference to the movements of said reciprocable compressor.

15. In a device of the class described the combination with two relatively movable compressors adapted to compress the article to be tufted, means for passing two parallel strands of twine through the article to be tufted, means for tying the knot in the ends of said two strands, of a tube arranged to hold a strand of worsted, a clamp adapted to grasp the end of said strand of worsted, means for moving the clamp and tube with respect to each other to place a length of worsted in position for its end to be encircled by the twine and means for cutting off the tuft-forming material to form tufts thereof.

16. In a device of the class described, the combination with two relatively movable compressors adapted to compress the article to be tufted, means for passing two parallel strands of twine through the article to be tufted, means for tying a knot in the ends of said two strands, of a suitable device on each compressor for feeding forward a continuous strip of tuft-forming material in position for its end to be encircled by the twine, and suitable mechanism for cutting off said material to form tufts thereof.

17. In a device of the class described, the combination with two relatively movable compressors adapted to compress the article to be tufted, means for passing two parallel strands of twine through the article to be tufted, means for tying a knot in the ends of said two strands, of a tube on each compressor adapted to hold a continuous strip of worsted and a device engaging the worsted and constructed and arranged to feed forward said worsted in position for its end to be encircled by the twine and means for cutting off said strip of worsted to form tufts thereof.

In witness whereof we have signed the above application for Letters Patent, at Boston, in the county of Suffolk and State of Massachusetts, this 25th day of February, A. D. 1903.

ROBERT R. THOMPSON.
CHARLES F. PINKHAM.

Witnesses:
  JAMES R. FLANAGAN,
  C. A. DUNPHY.